United States Patent
Sjöberg et al.

(10) Patent No.: US 12,501,079 B2
(45) Date of Patent: Dec. 16, 2025

(54) SIGNALING PARAMETER VALUE INFORMATION IN A PARAMETER SET TO REDUCE THE AMOUNT OF DATA CONTAINED IN AN ENCODED VIDEO BITSTREAM

(71) Applicant: Telefonaktiebolaget LM Ericsson (publ), Stockholm (SE)

(72) Inventors: Rickard Sjöberg, Stockholm (SE); Martin Pettersson, Vallentuna (SE); Per Wennersten, Årsta (SE); Mitra Damghanian, Upplands-Bro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 8 days.

(21) Appl. No.: 18/739,946

(22) Filed: Jun. 11, 2024

(65) Prior Publication Data
US 2024/0406456 A1    Dec. 5, 2024

Related U.S. Application Data

(63) Continuation of application No. 18/104,203, filed on Jan. 31, 2023, now Pat. No. 12,047,608, which is a
(Continued)

(51) Int. Cl.
*H04N 19/70* (2014.01)
*H04N 19/169* (2014.01)
(Continued)

(52) U.S. Cl.
CPC ........... *H04N 19/70* (2014.11); *H04N 19/174* (2014.11); *H04N 19/188* (2014.11); *H04N 19/46* (2014.11)

(58) Field of Classification Search
CPC .... H04N 19/70; H04N 19/174; H04N 19/188; H04N 19/46
(Continued)

(56) References Cited

U.S. PATENT DOCUMENTS 10,616,605 B2    4/2020    Esenlik et al.
2004/0218668 A1  11/2004   Hannuksela et al.
(Continued)

FOREIGN PATENT DOCUMENTS

CN    101389021    3/2009
EP    3 177 018    6/2017
(Continued)

OTHER PUBLICATIONS

International Search Report and Written Opinion issued in International Application No. PCT/SE2019/050596 dated Sep. 9, 2020 (15 pages).
(Continued)

*Primary Examiner* — Jae N Noh
(74) *Attorney, Agent, or Firm* — Rothwell, Figg, Ernst & Manbeck, P.C.

(57) ABSTRACT

A method performed by a decoder for decoding a bitstream comprising a picture parameter set, PPS, and a first set of slices. The method includes obtaining the picture parameter set. The method also includes decoding a syntax element included in the picture parameter set to obtain an indicator value. The decoder is configured such that if the indicator value is set to a first value then the decoder determines that a picture header included in the bitstream comprises a parameter value corresponding to a particular parameter, otherwise the decoder determines that each slice included in the first set of slices comprises a parameter value corresponding to the particular parameter. If the picture header comprises the parameter value corresponding to the particu-
(Continued)

lar parameter, then this parameter value is used to decode slice data of each slice included in the first set of slices.

27 Claims, 7 Drawing Sheets

Related U.S. Application Data continuation of application No. 17/532,328, filed on Nov. 22, 2021, now Pat. No. 11,582,488, which is a continuation of application No. 17/254,986, filed as application No. PCT/SE2020/050611 on Jun. 12, 2020, now Pat. No. 11,197,029.

(60) Provisional application No. 62/865,464, filed on Jun. 24, 2019.

(51) Int. Cl.
*H04N 19/174* (2014.01)
*H04N 19/46* (2014.01)

(58) Field of Classification Search
USPC ..................................... 375/240.26
See application file for complete search history.

(56) References Cited

U.S. PATENT DOCUMENTS

| | | |
|---|---|---|
| 2005/0053158 A1 | 3/2005 | Regunathan et al. |
| 2006/0050793 A1 | 3/2006 | Wang et al. |
| 2010/0189181 A1 | 7/2010 | Zheng et al. |
| 2012/0207227 A1 | 8/2012 | Tsai et al. |
| 2013/0188733 A1 | 7/2013 | Van der Auwera et al. |
| 2014/0003491 A1 | 1/2014 | Chen et al. |
| 2014/0003503 A1 | 1/2014 | Chen et al. |
| 2015/0016502 A1 | 1/2015 | Rapaka |
| 2016/0337649 A1 | 11/2016 | Chuang |
| 2018/0332280 A1* | 11/2018 | Sjöberg ............... H04N 19/70 |
| 2021/0160523 A1 | 5/2021 | Rapaka |

FOREIGN PATENT DOCUMENTS

| | | |
|---|---|---|
| KR | 10-2013-0054377 | 5/2013 |
| RU | 2 573 743 | 1/2016 |
| RU | 2 653 236 | 5/2018 |
| RU | 2 654 138 | 5/2018 |
| WO | 2013/009946 | 1/2013 |

OTHER PUBLICATIONS

Martin Pettersson et al., "AHG17: Parameters in PPS or slice headers", Joint Video Experts Team (JVET) of ITU-T Sg 16 WP 3 and ISO/IEC JTC 1/SC 29/WG 11, Document: JVET-O0238-v3, 15th Meeting: Gothenburg, SE, Jul. 2019 (6 pages).

Bross, B., et al., "Versatile Video Coding (Draft 5)," JVET-N1001-V7, Mar. 2019 (384 pages).

Rickard Sjöberg et al., "AHG17: Picture header NAL unit type", Joint Video Experts Team (JVET) of ITU-T SG 16 WP 3 and ISO/IEC JTC 1/SC 29/WG 11, Document: JVET-M0377-v2, 14th Meeting: Marrakesh, MA Jan. 2019 (11 pages).

Jill Boyce, "AHG15: On interoperability point signalling", Joint Video Experts Team (JVET) of ITU-T SG 16 WP 3 and ISO/IEC JTC 1/SC 29/WG 11, Document: JVET-N0276, 14th Meeting: Geneva, CH, Mar. 2019 (17 pages).

Geonjung Ko et al., "CE4-1.3: Modification of merge data syntax", Joint Video Experts Team (JVET) of ITU-T SG 16 WP 3 and ISO/IEC JTC 1/SC 29/WG 11, Document: JVET-N0237, 14th Meeting: Geneva, CH, Mar. 2019 (3 pages).

\* cited by examiner

SIGNALING PARAMETER VALUE INFORMATION IN A PARAMETER SET TO REDUCE THE AMOUNT OF DATA CONTAINED IN AN ENCODED VIDEO BITSTREAM

CROSS-REFERENCE TO RELATED APPLICATIONS

This application is a continuation of U.S. application Ser. No. 18/104,203, filed on 2023 Jan. 31 (now U.S. Pat. No. 12,047,608, issued on 2024 Jul. 23), which is a continuation of U.S. application Ser. No. 17/532,328, filed on 2021 Nov. 22 (now U.S. Pat. No. 11,582,488, issued on 2023 Feb. 14), which is a continuation of U.S. application Ser. No. 17/254,986, filed on 2020 Dec. 22 (now U.S. Pat. No. 11,197,029, issued on 2021 Dec. 7), which is a 35 U.S.C. § 371 National Stage of International Patent Application No. PCT/SE2020/050611, filed 2020 Jun. 12, which claims priority to U.S. provisional patent application No. 62/865,464, filed on 2019 Jun. 24. The above identified applications and patents are incorporated by this reference.

TECHNICAL FIELD

This disclosure relates to video coding and decoding.

BACKGROUND

1.1 HEVC and VVC

High Efficiency Video Coding (HEVC) is a block-based video codec standardized by ITU-T and MPEG. The HEVC video codec utilizes both temporal and spatial prediction. Spatial prediction is achieved using intra (I) prediction from within a current picture. Temporal prediction is achieved using uni-directional (P) or bi-directional (B) inter prediction on block level from previously decoded reference pictures. In the encoder, the difference between the original pixel data and the predicted pixel data, referred to as the residual, is transformed into the frequency domain, quantized and then entropy coded before being transmitted together with necessary prediction parameters, such as, for example, prediction mode and motion vectors, which are also entropy coded. The decoder performs entropy decoding, inverse quantization and inverse transformation to obtain the residual, and then adds the residual to an intra or inter prediction to reconstruct a picture.

MPEG and ITU-T are working on the successor to HEVC within the Joint Video Experts Team (JVET). The name of this video codec under development is Versatile Video Coding (VVC). The current VVC draft specification is found in JVET document JVET-N1001-v7.

1.2 Components

A video sequence consists of a series of pictures where each picture consists of one or more components. Each component can be described as a two-dimensional rectangular array of sample values. It is common that a picture in a video sequence consists of three components: one luma component Y, where the sample values are luma values, and two chroma components Cb and Cr, where the sample values are chroma values. It is also common that the dimensions of the chroma components are smaller than the luma components by a factor of two in each dimension to save bits in compression. For example, the size of the luma component of an HD picture is 1920×1080 and the chroma components each have the dimension of 960×540. Components are sometimes referred to as color components.

1.3 Blocks and Units

A block is one two-dimensional array of sample values (or "samples" for short). In video coding, each component is split into blocks and the coded video bitstream consists of a series of coded blocks. It is common in video coding that the picture is split into units that cover a specific area of the picture. Each unit consists of all blocks from all components that make up that specific area and each block belongs fully to one unit. The macroblock in H.264 and the coding unit (CU) in HEVC are examples of units.

A block can alternatively be defined as a two-dimensional array to which a transform used in coding is applied. These blocks are known as "transform blocks." Alternatively, a block can be defined as a two-dimensional array to which a single prediction mode is applied. These blocks are called "prediction blocks." In this disclosure, the word block is not tied to one of these definitions but that the descriptions herein can apply to either definition

1.4 NAL Units

Both HEVC and VVC define a Network Abstraction Layer (NAL). All the data (i.e., both Video Coding Layer (VCL) data or non-VCL data) in HEVC and VVC is encapsulated in NAL units. A VCL NAL unit contains data that represents sample values—i.e., a VCL NAL unit contains "sample data." A non-VCL NAL unit contains associated data such as parameter sets and supplemental enhancement information (SEI) messages. The NAL unit in HEVC and VVC begins with a NAL unit header that specifies the NAL unit type of the NAL unit, the layer ID of the layer to which the NAL unit belongs, and the temporal ID of the sub-layer to which the NAL unit belongs. The NAL unit type identifies the type of data that is carried in the NAL unit In HEVC, a forbidden_zero_bit is signaled to avoid MPEG-2 stream layer packetized elementary stream (PES) start code emulation and the NAL unit type is transmitted in the nal_unit_type syntax element in the NAL unit header. The syntax elements for the NAL unit header in HEVC is shown in Table 1, and the syntax elements for the NAL unit header in the current version of the VVC draft specification, JVET-N1001-v7, is shown in Table 2.

TABLE 1

| HEVC NAL unit header syntax | |
|---|---|
| | Descriptor |
| nal_unit_header( ) { | |
| forbidden_zero_bit | f(1) |
| nal_unit_type | u(6) |
| nuh_layer_id | u(6) |
| nuh_temporal_id_plus1 | u(3) |
| } | |

TABLE 2

| NAL unit header syntax for current version of VVC draft specification | |
|---|---|
| | Descriptor |
| nal_unit_header( ) { | |
| zero_tid_required_flag | u(1) |

TABLE 2-continued

NAL unit header syntax for current version of VVC draft specification

| | Descriptor |
|---|---|
| nuh_temporal_id_plus1 | u(3) |
| nal_unit_type_lsb | u(4) |
| nuh_layer_id | u(7) |
| nuh_reserved_zero_bit | u(1) |
| } | |

In the current version of VVC, a zero_tid_required_flag is signaled as the first bit of the NAL unit header. When this flag is equal to 1, nuh_temporal_id_plus1 must be equal to storage unit. Accordingly, a decoder may obtain a bitstream by receiving from the transmitter or retrieving it from a storage unit.

The NAL unit type indicates and defines how the NAL unit should be parsed and decoded. A VCL NAL unit provides information about the picture type of the current picture. The NAL unit types of the current version of the VVC draft specification are shown in Table 3.

The decoding order is the order in which NAL units shall be decoded, which is the same as the order of the NAL units within the bitstream. The decoding order may be different from the output order, which is the order in which decoded pictures are to be output, such as for display, by the decoder.

TABLE 3

NAL unit types in the current version of the VVC draft specification

| NalUnitType | Name of NalUnitType | Content of NAL unit and RBSP syntax structure | NAL unit type class |
|---|---|---|---|
| 0 | PPS_NUT | Picture parameter set pic_parameter_set_rbsp( ) | non-VCL |
| 1 | AUD_NUT | Access unit delimiter access_unit_delimiter_rbsp( ) | non-VCL |
| 2 | PREFIX_SEI_NUT | Supplemental enhancement information sei_rbsp( ) | non-VCL |
| 3 | SUFFIX_SEI_NUT | | |
| 4 | APS_NUT | Adaptation parameter set adaptation_parameter_set_rbsp( ) | non-VCL |
| 5 . . . 7 | RSV_NVCL5 . . . RSV_NVCL7 | Reserved | non-VCL |
| 8 | TRAIL_NUT | Coded slice of a non-STSA trailing picture slice_layer_rbsp( ) | VCL |
| 9 | STSA_NUT | Coded slice of an STSA picture slice_layer_rbsp( ) | VCL |
| 10 | RADL_NUT | Coded slice of a RADL picture slice_layer_rbsp( ) | VCL |
| 11 | RASL_NUT | Coded slice of a RASL picture slice_layer_rbsp( ) | VCL |
| 12 . . . 15 | RSV_VCL_12 . . . RSV_VCL_15 | Reserved non-IRAP VCL NAL unit types | VCL |
| 16 | DPS_NUT | Decoding parameter set decoding_parameter_set_rbsp( ) | non-VCL |
| 17 | SPS_NUT | Sequence parameter set seq_parameter_set_rbsp( ) | non-VCL |
| 18 | EOS_NUT | End of sequence end_of_seq_rbsp( ) | non-VCL |
| 19 | EOB_NUT | End of bitstream end_of_bitstream_rbsp( ) | non-VCL |
| 20 | VPS_NUT | Video parameter set video_parameter_set_rbsp( ) | non-VCL |
| 21 . . . 23 | RSV_NVCL21 . . . RSV_NVCL23 | Reserved | non-VCL |
| 24 | IDR_W_RADL | Coded slice of an IDR picture slice_layer_rbsp( ) | VCL |
| 25 | IDR_N_LP | | |
| 26 | CRA_NUT | Coded slice of a CRA picture slice_layer_rbsp( ) | VCL |
| 27 | GRA_NUT | Coded slice of a gradual random access picture slice_layer_rbsp( ) | VCL |
| 28 . . . 31 | UNSPEC28 . . . UNSPEC31 | Unspecified | non-VCL |

1. The zero_tid_required_flag can then be used together with nal_unit_type_lsb to derive the NAL unit type according to:
NalUnitType=(zero_tid_required_flag<<4)+nal_unit_type_lsb.

A decoder or bitstream parser can determine how the NAL unit should be handled, e.g. parsed and decoded, after looking at the NAL unit header. The rest of the bytes of the NAL unit is payload of the type indicated by the NAL unit type. A VVC bitstream (as well as an HEVC bitstream) consists of a sequence of NAL units. A bitstream may be transmitted over a network by a transmitter or stored in a 1.5 Intra random access point (IRAP) pictures and the coded video sequence (CVS).

For single layer coding in HEVC and the current VVC draft specification, an access unit (AU) is the coded representation of a single picture. An AU may consist of several video coding layer (VCL) NAL units as well as non-VCL NAL units. An AU may optionally start with an access unit delimiter (AUD) which indicates the start of the AU and the type of the slices allowed in the picture, i.e. I, I-P or I-P-B.

An intra random access point (IRAP) picture in HEVC is a picture that does not refer to any pictures other than itself for prediction in its decoding process. The first picture in the bitstream in decoding order in HEVC must be an IRAP picture but an IRAP picture may additionally also appear later in the bitstream. HEVC specifies three types of IRAP pictures, the broken link access (BLA) picture, the instantaneous decoder refresh (IDR) picture and the clean random access (CRA) picture.

A coded video sequence (CVS) in HEVC is a series of AUs starting at an IRAP AU up to, but not including the next IRAP AU in decoding order.

IDR pictures always start a new CVS. An IDR picture may have associated random access decodable leading (RADL) pictures. An IDR picture does not have associated RASL pictures.

BLA pictures in HEVC also start a new CVS and have the same effect on the decoding process as an IDR picture. However, a BLA picture in HEVC may contain syntax elements that specify a non-empty set of reference pictures. A BLA picture may have associated RASL pictures, which are not output by the decoder and may not be decodable, as they may contain references to pictures that may not be present in the bitstream. A BLA picture may also have associated RADL pictures, which are decoded. BLA pictures are not defined in the current version of VVC.

A CRA picture may have associated RADL or RASL pictures. As with a BLA picture, a CRA picture may contain syntax elements that specify a non-empty set of reference pictures. For CRA pictures, a flag can be set to specify that the associated RASL pictures are not output by the decoder, because they may not be decodable, as they may contain references to pictures that are not present in the bitstream. A CRA may start a CVS.

In the current version of the VVC draft specification, a CVS is started at a CVS start (CVSS) access unit, which may contain an IRAP picture, i.e., an IDR or a CRA picture, or a gradual random access (GRA) picture.

GRA pictures are essentially used for random access in bitstreams encoded for low-delay coding where a full IRAP picture would cause too much delay. A GRA picture may use gradual intra refresh that updates the video picture by picture where each picture is only partially intra coded. It is signaled with the GRA picture when the video is fully refreshed and ready for output, given that the bitstream was tuned into at the GRA picture. A GRA may start a CVS.

1.6 Parameter Sets

HEVC and VVC specify three types of parameter sets: 1) the picture parameter set (PPS), 2) the sequence parameter set (SPS), and 3) the video parameter set (VPS). The PPS contains data that is common for one or more pictures, the SPS contains data that is common for a coded video sequence (CVS), and the VPS contains data that is common for multiple CVSs.

The current version of VVC also specifies two additional parameter sets: the adaptation parameter set (APS) and the decoder parameter set (DPS). APS carries parameters needed for the adaptive loop filter (ALF) tool and the luma mapping and chroma scaling (LMCS) tool. DPS specifies information that may not change during the decoding session and may be good for the decoder to know about, e.g. the maximum number of allowed sub-layers. The information in DPS is not necessary for operation of the decoding process.

.7 Tiles and Bricks

The draft VVC video coding standard includes a tool called tiles that divides a picture into rectangular spatially independent regions. Tiles in the draft VVC coding standard are similar to the tiles used in HEVC, but with a two-step partitioning mechanism. Using tiles, a picture in VVC can be partitioned into rows and columns of samples where a tile is an intersection of a row and a column. For example, a picture may be divided into 4 tile rows and 5 tile columns resulting in a total of 20 tiles for the pictures.

The tile structure is signaled in a PPS by specifying the thicknesses (i.e., the heights) of the rows and the widths of the columns. Individual rows and columns can have different sizes, but the partitioning always spans across the entire picture, from left to right and top to bottom respectively.

There is no decoding dependency between tiles of the same picture. This includes intra prediction, context selection for entropy coding and motion vector prediction. One exception is that in-loop filtering dependencies are generally allowed between tiles.

The two-step tile partitioning in VVC starts by partitioning the picture into tiles as in HEVC. Then each tile can be optionally partitioned into bricks by horizontal boundaries. In the current VVC specification draft, the word brick is used also for tiles which are not further partitioned into bricks.

1.8 Slices

The concept of slices in HEVC divides the picture into one or more independently coded slices, where decoding of one slice in a picture is independent of other slices in the same picture. Different coding types could be used for slices of the same picture—i.e., a slice could be an I-slice, P-slice, or B-slice. The main purpose of slices is to enable resynchronization in case of data loss.

In the current version of VVC, a slice consists of either a number of complete tiles or only a consecutive sequence of complete bricks of one tile. Each slice has a slice header comprising parameters that may be set for individual slices and slice data. Some parameters are restricted to be the same for all slices in a picture. Each slice in a CVS is carried in a separate VCL NAL unit. In a previous version of the VVC draft specification, slices were referred to as tile groups.

SUMMARY

Certain challenges exist. For example, in the current version of the VVC draft specification, one or more particular parameters signaled in a slice header may stay constant for the entire bitstream. Accordingly, signaling the same value for such a parameter in all slice headers causes an unnecessary penalty in compression efficiency.

This inefficiency can be reduced by, for example, 1) determining at least one parameter whose value will sometimes stay constant for each segment included in a set of segments (e.g., for each slice included in a particular CVS) and sometimes not stay constant and 2) including information in, for example, a particular parameter set (e.g., a parameter set included in the particular CVS) where the information indicates that: i) each segment included in the set of segments comprises a parameter value corresponding to the parameter (e.g., each segment contains a codeword (e.g., a syntax element) from which the parameter value can be derived), ii) a parameter set comprises a parameter value corresponding to the parameter and that this parameter value can be used to decode segment data of each segment included in the set of segments, iii) a default parameter value corresponding to the parameter can be used to decode segment data of each segment included in the set of segments, or iv) a parameter value corresponding to the parameter can be derived from one or more other parameter values included in the bitstream and that the derived parameter value can be used to decode segment data of each segment included in the set of segments. In this way, bits can be saved by signaling in a parameter set a parameter value that can be used for all segments in a particular set of segments, rather than signaling the parameter value in each segment included in the set of segments.

Accordingly, in one aspect there is provided a decoding method performed by a decoder for decoding a bitstream, the bitstream comprising a picture parameter set, PPS, and a first set of slices. The method includes the decoder obtaining the picture parameter set. The method also includes the decoder decoding a first syntax element included in the picture parameter set to obtain an indicator value. The decoder is configured such that if the indicator value is set to a first value then it is determined that a picture header included in the bitstream comprises a parameter value corresponding to a particular parameter, otherwise it is determined that each slice included in the first set of slices comprises a parameter value corresponding to the particular parameter. If the picture header comprises the parameter value corresponding to the particular parameter, then the parameter value is used to decode slice data of each slice included in the first set of slices.

In another aspect there is provided an encoding method performed by an encoder. The method includes the encoder generating a first set of slices. The method also includes the encoder generating a picture parameter set, wherein the picture parameter set includes a first codeword that is set to either a first value or a second value. When the first codeword is set to the first value, then the first codeword indicates that a picture header generated by the encoder comprises a parameter value corresponding to a particular parameter that was used to encode slice data of each slice included in the first set of slices, and when the first codeword is set to the second value, then the first codeword indicates that each slice included in the first set of slices comprises a parameter value corresponding to the particular parameter.

In another aspect there is provided a computer program comprising instructions which when executed by processing circuitry causes the processing circuitry to perform any of the methods disclosed herein. In another aspect there is provided a carrier containing the computer program, wherein the carrier is one of an electronic signal, an optical signal, a radio signal, and a computer readable storage medium.

In another aspect there is provided a decoder for performing the above described decoding method. In one embodiment, the decoder comprises a computer readable storage medium and processing circuitry coupled to the storage medium, wherein the decoder is configured to perform the decoding method.

In another aspect there is provided an encoder for performing the above described encoding method. In one embodiment, the encoder comprises a computer readable storage medium and processing circuitry coupled to the storage medium, wherein the encoder is configured to perform the encoding method.

An advantage of the embodiments disclosed herein is that, for each parameter that stays constant in at least a portion of a bitstream (e.g. in a CVS), there is no need to signal the parameter value for the parameter at the segment (e.g. slice) level, which saves bits and improves the overall compression efficiency.

DETAILED DESCRIPTION

The embodiments described herein can be used in a video encoder or video decoder.

Figure 1:
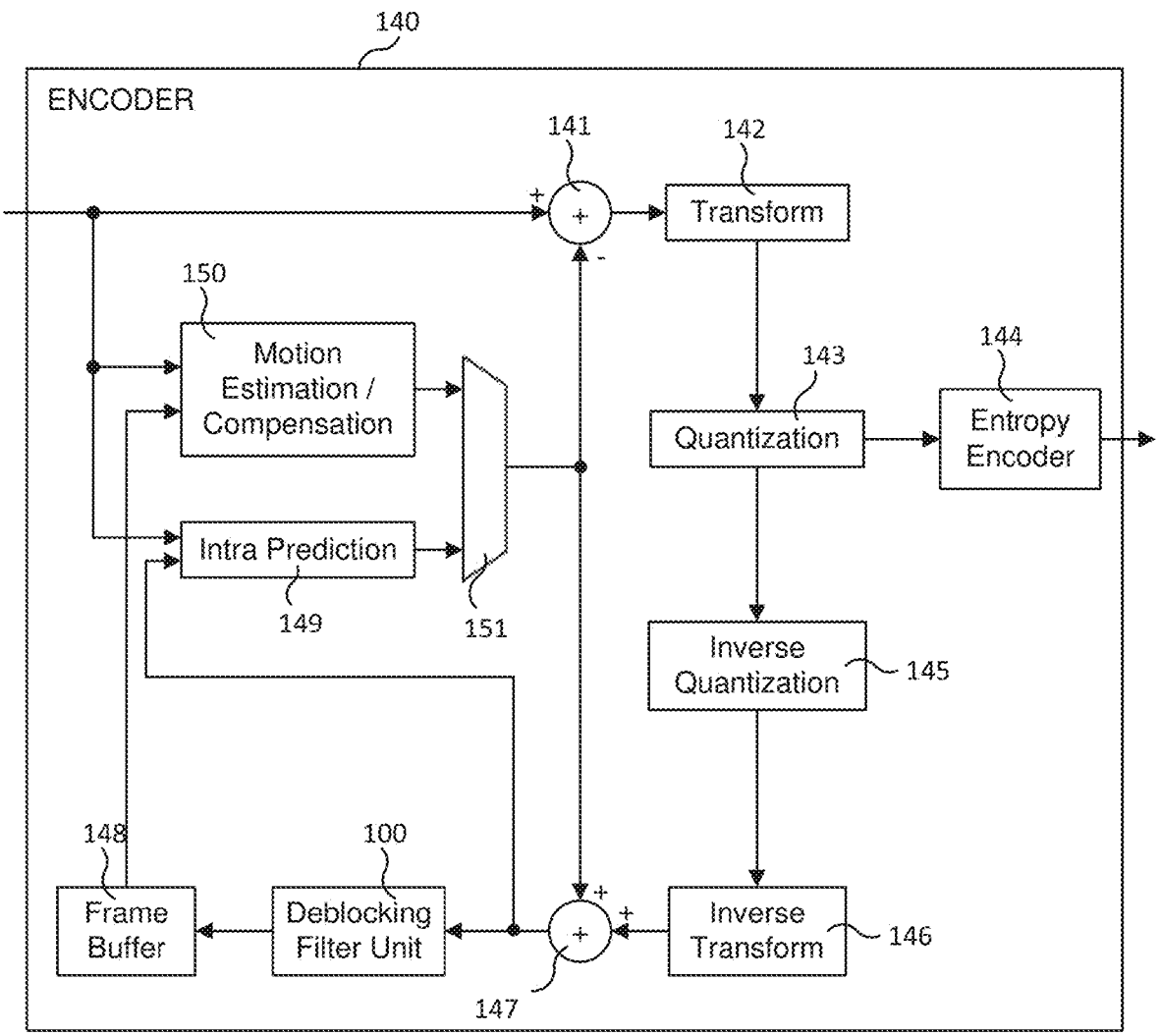
FIG. 1 is a schematic block diagram of a video encoder according to one embodiment.

FIG. 1 is a schematic block diagram of a video encoder 140 according to one embodiment. A current block of pixels is predicted by performing a motion estimation using motion estimator 150 from an already provided block of pixels in the same frame or in a previous frame. The result of the motion estimation is a motion or displacement vector associated with the reference block, in the case of inter prediction. The motion vector may be used by motion compensator 150 to output an inter prediction of the block of pixels. Intra predictor 149 computes an intra prediction of the current block of pixels. The outputs from the motion estimator/compensator 150 and the intra predictor 149 are input in selector 151 that either selects intra prediction or inter prediction for the current block of pixels. The output from the selector 151 is input to an error calculator in the form of adder 141 that also receives the pixel values of the current block of pixels. Adder 141 calculates and outputs a residual error as the difference in pixel values between the block of pixels and its prediction. The error is transformed in transformer 142, such as by a discrete cosine transform, and quantized by quantizer 143 followed by coding in encoder 144, such as by entropy encoder. In inter coding, also the estimated motion vector is brought to encoder 144 to generate the coded representation of the current block of pixels. The transformed and quantized residual error for the current block of pixels is also provided to an inverse quantizer 145 and inverse transformer 146 to retrieve the original residual error. This error is added by adder 147 to the block prediction output from the motion compensator 150 or intra predictor 149 to create a reference block of pixels that can be used in the prediction and coding of a next block of pixels. This new reference block is first processed by a deblocking filter 100. The processed new reference block is then temporarily stored in frame buffer 148, where it is available to intra predictor 149 and motion estimator/compensator 150.

Figure 2:
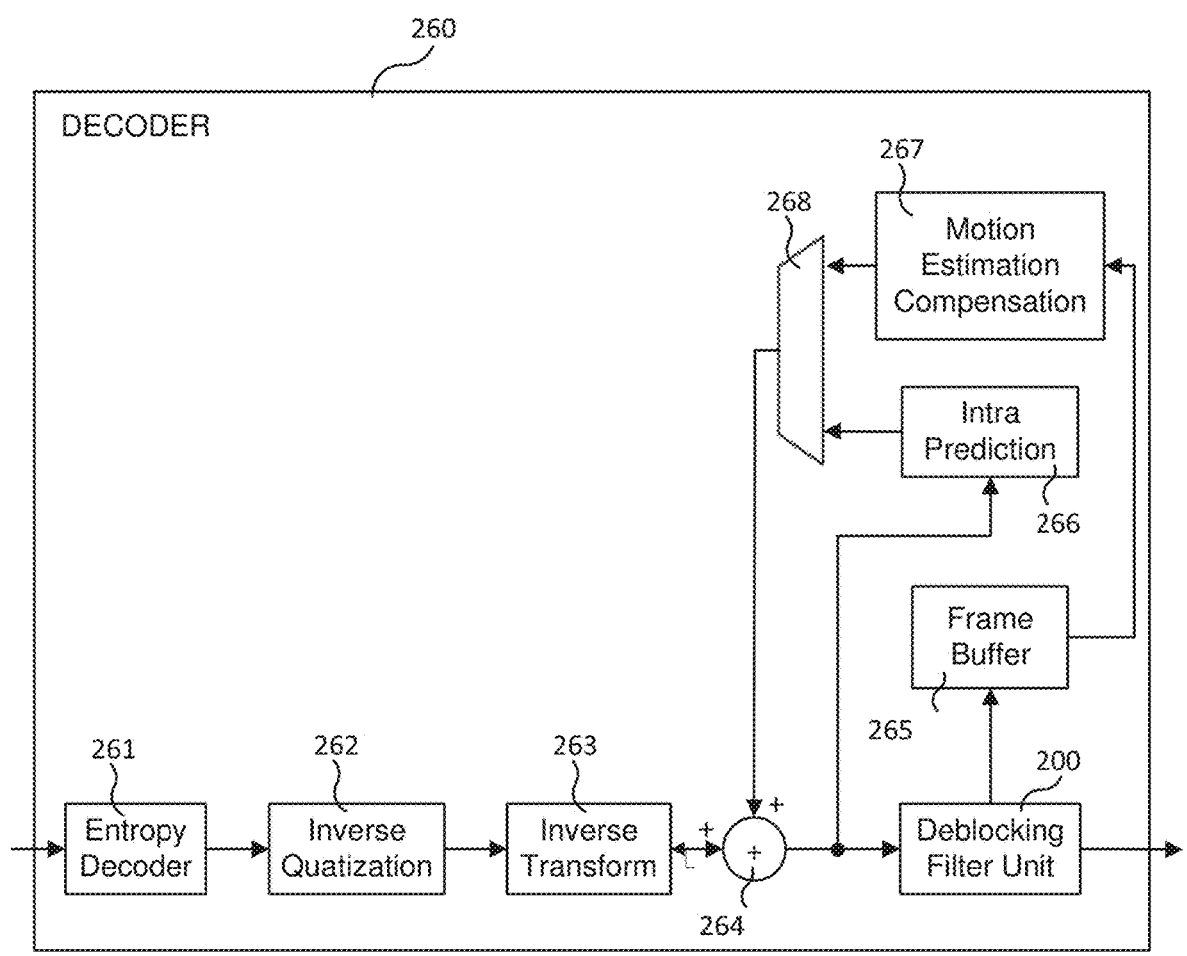
FIG. 2 is a schematic block diagram of a video decoder according to one embodiment.

FIG. 2 is a block diagram of a video decoder 260 according to some embodiments. Decoder 260 includes decoder 261, such as entropy decoder, to decode an encoded representation of a block of pixels to get a set of quantized and transformed residual errors. These residual errors are dequantized by inverse quantizer 262 and inverse transformed by inverse transformer 263 to provide a set of residual errors. These residual errors are added by adder 264 to the pixel values of a reference block of pixels. The reference block is determined by a motion estimator/compensator 267 or intra predictor 266, depending on whether inter or intra prediction is performed. Selector 268 is thereby interconnected to adder 264 and motion estimator/compensator 267 and intra predictor 266. The resulting decoded block of pixels output from adder 264 is input to deblocking filter 200. The filtered block of pixels is output from decoder 260 and may be furthermore temporarily provided to frame buffer 265 to be used as a reference block of pixels for a subsequent block of pixels to be decoded. Frame buffer 265 is thereby connected to motion estimator/compensator 267 to make the stored blocks of pixels available to motion estimator/compensator 267. The output from adder 264 may also be input to intra predictor 266 to be used as an unfiltered reference block of pixels.

As noted above, in the current version of the VVC draft specification, one or more particular parameters signaled in a slice may stay constant for the entire bitstream (or for some portion of the bitstream, such as a CVS). Accordingly, signaling the same value for such a parameter in all such slices causes an unnecessary penalty in compression efficiency.

In the development of VVC, a reference software called VTM and a set of common test conditions (CTC) have been defined to easily verify improvements to the codec and to ensure that the codec is developed with the proper scope. The VVC CTC comprises four different sets of coding conditions: 1) all intra (AI) where all pictures are intra-only coded, 2) random access (RA) with IRAP pictures coded in a periodic interval, 3) low-delay with B-pictures (LDB), and 4) low-delay with P-pictures (LDP). Each set of coding conditions comprises a configuration setting to input to the VVC encoder and a set of test sequences to use for testing the VVC codec.

In table 4 below, it is shown which slice header parameters (i.e., slice header syntax elements) stay constant over all test sequences for each of the four set of test conditions AI, RA, LDB and LDP in the current version of the CTC using VTM 5.0.

a parameter set included in the particular CVS) where the information indicates that: i) each segment included in the set of segments comprises a parameter value corresponding to the parameter (e.g., each segment included in the set of segments comprises a codeword from which the parameter value can be derived), ii) a parameter set comprises a parameter value corresponding to the parameter and that this parameter value can be used to decode segment data of each segment included in the set of segments, iii) a default parameter value corresponding to the parameter can be used to decode segment data of each segment included in the set of segments, or iv) a parameter value corresponding to the parameter can be derived from one or more other parameter values included in the bitstream and that the derived parameter value can be used to decode segment data of each segment included in the set of segments. In this way, bits can be saved by signaling in a parameter set a parameter value that can be used for all segments in a particular set of segments, rather than signaling the parameter value in each segment included in the set of segments.

Accordingly, in one embodiment, a parameter value that always stays constant in a CVS is preferably signaled only once in the CVS, typically in the sequence parameter set (SPS). Examples of parameters that always stay constant in a CVS are the width and height of the video—e.g., pic_width_in_luma_samples and pic_height_in_luma_samples in the current version of VVC. A parameter value that always changes in a CVS with multiple segments should be signaled for each segment. An example parameter that always changes picture-by-picture in a CVS is the least significant bits of the picture order count value, slice_pic_order_cnt_lsb, in the current version of VVC (when there are multiple segments per picture, slice_pic_order_cnt_lsb will be the same for all of the segments of the picture). Besides the always constant and always changing parameter

TABLE 4

| Slice parameter name | Constant in | | | |
| --- | --- | --- | --- | --- |
| | AI | RA | LDB | LDP |
| no_output_of_prior_pics_flag | x | | | |
| slice_sao_luma_flag | x | | | |
| slice_sao_chroma_flag | x | | | |
| tile_group_alf_enabled_flag | x | | | |
| dep_quant_enabled_flag | x | x | x | x |
| partition_constrainst_override_flag | x | | | |
| slice_loop_filter_across_slices_enabled_flag | x | x | x | x |
| short_term_ref_pic_set_sps_flag | x | | x | x |
| inter_ref_pic_set_prediction_flag | x | | | |
| slice_temporal_mvp_enabled_flag | | | x | x |
| mvd_l1_zero_flag | | | x | |
| collocated_from_l0_flag | | | x | |
| num_negative_pics | x | | | |
| num_positive_pics | x | | | |
| reshaper_model_delta_max_bin_idx | x | | | |
| slice_reshaper_ChromaAdj | | | x | x |
| six_minus_max_num_merge_cand | x | x | x | x |
| five_minus_max_num_affine_merge_cand | | x | x | x |
| max_num_merge_cand_minus_max_num_triangle_cand | | x | x | |
| collocated_ref_idx | | x | x | x |
| slice_type | x | | | |

The above described inefficiency can be reduced by, for example, 1) determining at least one parameter whose value will sometimes stay constant for each segment included in a set of segments (e.g., for each slice included in a particular CVS) and sometimes not stay constant and 2) including information in, for example, a particular parameter set (e.g., values, there are some parameter values that sometimes change between segments and sometimes stay constant for the whole CVS.

Accordingly, in one embodiment, for a set of parameters that may stay constant for all segments in a CVS, it is indicated in a parameter set, e.g. SPS, whether the value of each parameter in the set is signaled in the parameter set or the value of the parameter is signaled in each segment header, e.g., slice header. If the value of a specific parameter in the set stays constant in the CVS, bits can be saved by signaling the parameter value in the parameter set. If the parameter value is not constant for all segments in the CVS, then the value is signaled in each segment header of the CVS.

Figure 3:
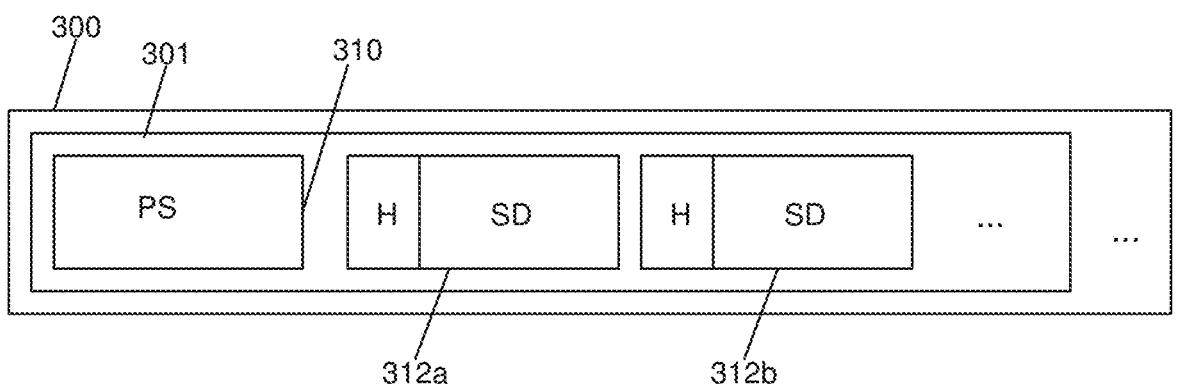
FIG. 3 illustrates an encoded video bitstream according to an embodiment.

FIG. 3 illustrates an example video bitstream 300. The bitstream 300 includes a CVS 301, which comprises a parameter set (PS) 310 (e.g., a non-VCL NAL unit that contains a parameter set) and a number of segments (e.g., a number of VCL NAL units that contain a slice). Segments 312a and 312b are shown. A segment is a unit of data that comprises segment data (SD), which comprises sample data. A segment may have a segment header (SH) in addition to the segment data (SD). A VVC slice is an example of a segment. A segment can also be a picture, a tile group or some other entity that comprises a full picture or a part of a picture. In this example, each segment includes a segment header in addition to the segment data.

Parameter Value in Parameter Set or Segment

In one embodiment, the value of a particular parameter (denoted "P") may either be constant for all segments in a CVS or may change from segment to segment depending on the scenario. For instance, the parameter P may stay constant for certain configurations (e.g. in a low-delay video conference application), but would not stay constant in a broadcasting scenario. The encoder would typically be configured or know in advance whether parameter P would stay constant or not for a CVS.

In this embodiment an indicator value is signaled in a parameter set, where the indicator value specifies whether the value for parameter P is signaled in the parameter set or signaled for each segment in the CVS. In one embodiment, the indicator value can be derived from a codeword (i.e., a particular set of bits) included in the parameter set.

If the indicator value specifies that the parameter value is signaled in the parameter set, then the parameter value is only signaled in the parameter set and that value may then be used for all segments in the CVS.

If the indicator value specifies that the parameter value is signaled for each segment, then for one version of this embodiment the parameter value to use for each segment is signaled in each segment and not in the parameter set.

In another version of this embodiment, the value of the parameter is first set in the parameter set and then it is determined for each segment whether the parameter value should be overwritten or not.

In one version of this embodiment, the indication whether the value of the parameter is signaled in a parameter set or in each segment header, is signaled separately from the parameter value in the parameter set (e.g., the indication value and the parameter value are signaled with two different codewords, each corresponding to a different syntax element). This is illustrated in the sequence parameter set (SPS) and segment header syntax tables and semantic descriptions below, where param_X, param_Y and param_Z are segment level parameters that may be signaled in SPS:

TABLE 5

Example SPS syntax

|  | Descriptor |
|---|---|
| seq_parameter_set_rbsp( ) { |  |
| ... |  |
| sps_signal_common_slice_params_in_sps_flag | u(1) |
| if ( sps_signal_common_slice_params_in_sps_flag ) { |  |
| sps_param_X_flag | u(1) |
| sps_param_Y_flag | u(1) |
| sps_param_Z_flag | u(1) |
| ... |  |
| if (sps_param_X_flag) |  |
| param_X | u(1) |
| if (sps_param_Y_flag) |  |
| param_Y | u(v) |
| if (sps_param_Z_flag) |  |
| param_Z | ue(v) |
| ... |  |
| } |  |
| ... |  |
| } |  |

TABLE 6

Example Segment Header Syntax

|  | Descriptor |
|---|---|
| segment_header( ) { |  |
| ... | ... |
| if (!sps_param_X_flag) |  |
| param_X | u(1) |
| if (!sps_param_Y_flag) |  |
| param_Y | u(v) |
| if (!sps_param_Z_flag) |  |
| param_Z | ue(v) |
| ... | ... |
| } |  |

TABLE 7

Semantics sps_signal_common_slice_params_in_sps_flag:
  When equal to 1 specifies that param_X, param_Y, and param_Z may be specified in either SPS or in slice headers.
  When equal to 0 specifies that param_X, param_Y and param_Z are specified in slice headers and that sps_param_X_flag, sps_param_Y_flag, sps_param_Z_flag are inferred to be equal to 0.
sps_param_X_flag:
  When equal to 1 specifies that param_X is present in SPS.
  When equal to 0 specifies that param_X is present in slice headers.
sps_param_Y_flag:
  When equal to 1 specifies that param_Y is present in SPS.

TABLE 7-continued

Semantics

When equal to 0 specifies that param_Y is present in slice headers.
sps_param_Z_flag:
  When equal to 1 specifies that param_Z is present in SPS.
  When equal to 0 specifies that param_Z is present in slice headers.

In one version of this embodiment the indicator value that indicates whether a non-negative integer value of the parameter is signaled in a parameter set or in each segment header, is signaled in the same codeword (denoted cw1) as the non-negative integer parameter value in the parameter set, if the indicator value specifies that the non-negative integer parameter value is signaled in the parameter set. For instance, the codeword cw1 may take on any non-negative integer values with the following interpretation:

if cw1=0, then the parameter value is signalled in slice headers;
  else, the parameter value is equal to the cw1−1.

In one realization of this embodiment, the indicator value indicator_flag and the non-negative integer parameter value param_p_value are derived from a first codeword cw1 in the parameter set according to the following pseudo code:

```
Indicator_flag = cw1>0
if ( indicator_flag ) {
    param_p_value = cw1 − 1
}
```

The following pseudo code shows how the parameter value is derived from a second codeword cw2 in the segment header if the indicator value specifies that the parameter value is signaled for each segment:

```
if ( !indicator flag ) {
    param_p_value = cw2
}
```

In one more compact realization of this version of the embodiment, a first codeword cw1 is signaled in the parameter set and the parameter value param_p_value is derived from cw1 according to the following pseudo code, where cw1 equal to 0 indicates that param_p_value is signaled in each segment with the codeword cw2, and cw1 larger than 0 indicates that param_p_value is signaled in the parameter set and has the value cw1−1:

```
if ( !cw1 ) {
    param_p_value = cw2
}
else {
    param_p_value = cw1 − 1
}.
```

Note that the "!cw1" statement above could equivalently be expressed as "cw1>0".

In another version of this embodiment, the indicator value is signaled in a first parameter set, e.g. in the SPS. If the indicator value specifies that the parameter value is not signaled for each segment, then the parameter value is signaled in a second parameter set, e.g. in PPS.

Parameter P may be any segment parameter that may stay constant for a CVS, for instance any of the following parameters of the current VTM version 5.0:

no_output_of_prior_pics_flag,
slice_sao_luma_flag,
slice_sao_chroma_flag,
tile_group_alf_enabled_flag,
dep_quant_enabled_flag,
partition_constrainst_override_flag,
slice_loop_filter_across_slices_enabled_flag,
short_term_ref_pic_set_sps_flag,
inter_ref_pic_set_prediction_flag,
slice_temporal_mvp_enabled_flag,
mvd_l1_zero_flag,
collocated_from_l0_flag,
num_negative_pics,
num_positive_pics,
reshaper_model_delta_max_bin_idx,
slice_reshaper_ChromaAdj,
six_minus_max_num_merge_cand,
five_minus_max_num_affine_merge_cand,
max_num_merge_cand_minus_max_num_triangle_cand,
collocated_ref_idx
slice_type,
log2_diff_min_qt_min_cb,
max_mtt_hierarchy_depth,
log2_diff_max_bt_min_qt, or
log2_diff_max_tt_min_qt.

While one parameter P has been discussed so far, there may be more than one parameter at a time that sometimes stay constant in a CVS. We will refer to these parameters as parameters p1, p2, . . . pN in the example syntax below.

TABLE 8

Example SPS syntax

| | Descriptor |
|---|---|
| seq_parameter_set_rbsp( ) { | ... |
| ... | |
| sps_param_p1 | ue(v) |
| sps_param_p2 | ue(v) |
| ... | ... |
| sps_param_pN | ue(v) |
| ... | ... |
| } | | sps_param_p1 equal to 0 specifies that param_p1 is present in slice headers. sps_param_p1 larger than 0 specifies that the value of param_p1 is set equal to sps_param_p1 minus 1.

sps_param_p2 equal to 0 specifies that param_p1 is present in slice headers. sps_param_p2 larger than 0 specifies that the value of param_p2 is set equal to sps_param_p2 minus 1.

sps_param_pN equal to 0 specifies that param_pN is present in slice headers. sps_param_pN larger than 0 specifies that the value of param_pN is set equal to sps_param_pN minus 1.

TABLE 9

Example Slice header syntax

| | Descriptor |
|---|---|
| slice_header( ) { | |
| ... | ... |
| if (!sps_param_p1) | |
| param_p1 | ue(v) |
| if (!sps_param_p2) | |
| param_p2 | ue(v) |
| ... | ... |
| if (!sps_param_pN) | |
| param_pN | ue(v) |
| ... | ... |
| } | |

In one embodiment a grouping flag is used such that if the grouping flag is set to 1, all the parameters in the parameter group may be signaled either in the parameter set or in the segment header. If the grouping flag is set to 0, the parameters in the parameter group are always signaled in the slice header. This is exemplified in the syntax and semantics below.

TABLE 10

Example SPS syntax illustrating grouping flag

| | Descriptor |
|---|---|
| seq_parameter_set_rbsp( ) { | |
| ... | ... |
| grouping_flag | u(1) |
| if ( grouping_flag ) { | |
| sps_param_p1 | ue(v) |
| sps_param_p2 | ue(v) |
| ... | ... |
| sps_param_pN | ue(v) |
| } | |
| ... | ... |
| } | | grouping_flag equal to 1 specifies that param_p1, param_p2, ..., param_pN may be specified in either SPS or in slice headers. grouping_flag equal to 0 specifies that param_p1, param_p2, ..., param_pN are specified in slice headers.

sps_param_p1 equal to 0 specifies that param_p1 is present in slice headers. sps_param_p1 larger than 0 specifies that the value of param_p1 is set equal to sps_param_p1 minus 1.

sps_param_p2 equal to 0 specifies that param_p2 is present in slice headers. sps_param_p2 larger than 0 specifies that the value of param_p2 is set equal to sps_param_p2 minus 1.

sps_param_pN equal to 0 specifies that param_pN is present in slice headers. sps_param_pN larger than 0 specifies that the value of param_pN is set equal to sps_param_pN minus 1.

TABLE 11

Example Segment header illustrating Grouping Flag

| | Descriptor |
|---|---|
| segment_header( ) { | |
| ... | ... |
| if ( grouping_flag ) { | |
| if (!sps_param_p1) | |
| param_p1 | ue(v) |
| if (!sps_param_p2) | |
| param_p2 | ue(v) |
| ... | ... |
| if (!sps_param_pN) | |
| param_pN | ue(v) |
| } else { | |
| param_p1 | ue(v) |
| param_p2 | ue(v) |
| ... | |
| param_pN | ue(v) |
| } | |
| ... | |
| } | |

In one embodiment the grouping flag equal to 1 specifies that the parameters in the parameter group are using their default values and the grouping flag equal to 0 specifies that the parameters in the parameter group are signaled in the segment header. Thus, in this version of the embodiment the parameters are never signaled in the parameter set, since the default values are used instead.

In one embodiment the grouping flag is derived from parameter values in the bitstream. For instance, the choice of signaling the parameter values in either the parameter set or the segment header may only available for non-IRAP pictures.

In one embodiment, an encoder may perform a subset or all of the following steps to encode one or more pictures into a coded video stream (CVS), where the CVS will comprise at least a first parameter set and a set of two or more segments. The first parameter set may for instance be an SPS, PPS, DPS, VPS or a picture header parameter set (PHPS).

Step 1: Determine for a parameter P if the value of parameter P will stay constant for all segments in the CVS.

Step 2: Construct the first parameter set such that the parameter set provides information that specifies whether or not the value of parameter P is signaled in a parameter set (e.g., the first parameter set or another parameter set). For example, if it is determined that the value of parameter P will stay constant for all segments in the CVS, then the information will specify that the value of parameter P is signaled in a parameter set, otherwise the information will specify that the value of parameter P is signaled for each segment in the CVS. If the value of parameter P is signaled in a parameter set, the value of parameter P may be encoded in a codeword that also provides the information as to whether or not the value of parameter P is signaled in a parameter set.

Step 3: For each segment in the CVS, if it is determined that the value of parameter P will stay constant for all segments in the CVS, then include the value of parameter P in the segment. The value is preferably included in the segment header (e.g., encoded in a codeword in the segment header).

Step 4: For each segment, if the parameter value for parameter P is included in the segment, then encode segment data of the segment using the value of parameter P that is included in the segment, otherwise encode segment data of the segment using the value of parameter P that is signaled by the parameter set.

In one embodiment, a decoder may perform a subset or all of the following steps to decode one or more pictures from a coded video stream (CVS), where the CVS comprises at least a first parameter set and two or more segments.

Step 1: Decode an indicator value from a first codeword in the first parameter set in the CVS. The indicator value may be a 1-bit value (e.g., the codeword may consist of a single bit).

Step 2: Determine from the indicator value whether the value of a parameter P is specified in a parameter set or specified by a second codeword in each segment. The presence of the second codeword in the segments may be conditioned on the indicator value.

Step 3: If it is determined that the value of the parameter P is specified in the parameter set, then decode the value of the parameter P from the parameter set. The value of parameter P may for instance be derived from the first codeword or decoded from a third codeword in the parameter set.

Step 4: For each segment, perform steps 4A and 4B.

Step 4A: If it is determined that the value of the parameter P is specified in each segment, then decode the value of the parameter P from the second codeword in the segment. The second codeword is preferably decoded from the segment header.

Step 4B: Decode segment data of the segment using the value of parameter P.

In a variant of this embodiment the indicator value specifies that the value of parameter P is set to a default value known to the decoder or the value of parameter P is signaled for each segment in the CVS.

Cases in Which the Parameter Value is a 1-bit Value

In some use cases the the parameter value for parameter P is a boolean value, instead of a generic value or a non-negative integer value. For such use cases parameter P is referred to as "flag F."

In embodiment, the indication as to whether flag F is signaled in a parameter set or in each segment header is signaled separately from the value of flag F in the parameter set, e.g., the indication value and the parameter value are signaled with two different codewords.

In an alternative embodiment, if the indicator value specifies that the value of flag F is signaled in the parameter set, then the indicator value is signaled in the same codeword as the value of flag F.

For instance, the codeword may be a 2-bit codeword (denoted cw) that can take on at least three different values, 0, 1 and 2 with the following interpretation:
cw=0: The value of flag F is signalled in segment headers;
cw=1: The value of flag F is 0; and
cw>1 (e.g., cw=2): The value of flag F is 1.

In alternative embodiment, the values of cw have the following interpretation:
cw=0: The value of flag F is 0;
cw=1: The value of flag F is 1; and
cw>1 (e.g., cw=2): The value of flag F is signalled in segment headers.

In one embodiment, a first codeword cw1 (e.g., a 2-bit long codeword) is signaled in the parameter set and the value of flag F (denoted "flag_f_value") is derived from cw1, where a value of cw1 equal to 0 specifies that flag_f_value is signaled in a codeword (denoted cw2) in each segment, and the value of cw1 equal to 1 or 2 specifies that flag_f_value=the value of (cw1−1). This is illustrated in the following pseudo code:

```
if ( cw1 == 0 ) {
    flag_f_value = cw2
} else {
    flag_f_value = cw1−1
}.
```

In another embodiment, the indicator value, indicator_flag, and the value of flag F, flag_f_value, are derived from a first codeword cw1 in the parameter set according to the following pseudo code:

```
if cw1 == 0, then indicator_flag = 0, otherwise indicator_flag = 1;
if (indicator_flag ) {
    flag_f_value = cw1−1
}.
```

The following pseudo code shows how the value of flag F is derived from a second codeword (or flag) cw2 in the segment header if the indicator value specifies that the value of flag F is signaled for each segment:

```
if ( !indicator_flag ) {
    flag_f_value = cw2
}.
```

In one embodiment, the indicator value indicator flag and the value of flag F flag_f_value may be derived from three values of the first codeword cw1, for instance according to:

TABLE 12 indicator flag and flag_f_value derived from three values of the codeword cw1

| cw1 | indicator_flag | flag_f_value |
|---|---|---|
| 0 | 0 | The value is specified in each segment header |
| 10 | 1 | flag_f_value = 0 |
| 11 | 1 | flag_f_value = 1 |

The codeword cw1 could be signaled with a fixed coding descriptor such as u(2), meaning that 2 bits are always signaled. The codeword cw1 could also be signaled with a truncated unary binarization descriptor with a maximum value (maxVal) set to 2, that may only signal three values, e.g. (0, 10 or 11). The truncated unary binarization descriptor could, as in the draft VVC specification, be indicated with a tu(v) in the syntax table:

TABLE 13

Example of trinary coding descriptor

|  | Descriptor |
|---|---|
| seq_parameter_set_rbsp( ) { | |
| ... | |
| sps_or_slice_f1_flag | tu(v) |
| ... | |
| } | |

A benefit of coding cw1 with 0, 10 or 11 compared to using two fixed bits is that whenever the flag_f_value is to be specified in the segment header, only one bit needs to be signaled.

Other codeword values or combinations of the three values (0, 10, 11), could also be considered, for instance (1, 01, 00) or (10, 11, 0).

The following example syntax and semantics illustrate how flags f1, f2, . . . fN may be specified.

TABLE 14

|  | Descriptor |
|---|---|
| seq_parameter_set_rbsp( ) { |  |
| ... | ... |
| sps_flag_f1 | tu(v) |
| sps_flag_f2 | tu(v) |
| .... | ... |
| sps_flag_fN | tu(v) |
| ... | ... |
| } |  | sps_flag_f1 equal to 0 specifies that flag_f1 is present in slice headers. sps_flag_f1 larger than 0 specifies that the value of flag_f1 is set equal to sps_flag_f1 minus 1. The maximum value maxVal of the truncated unary binarization tu(v) is set equal to 2.

sps_flag_f2 equal to 0 specifies that flag_f2 is present in slice headers. sps_flag_f2 larger than 0 specifies that the value of flag_f2 is set equal to sps_flag_f2 minus 1. The maximum value maxVal of the truncated unary binarization tu(v) is set equal to 2.

sps_flag_fN equal to 0 specifies that flag_fN is present in slice headers. sps_flag_fN larger than 0 specifies that the value of flag_fN is set equal to sps_flag_fN minus 1. The maximum value maxVal of the truncated unary binarization tu(v) is set equal to 2.

TABLE 15

|  | Descriptor |
|---|---|
| slice_header( ) { |  |
| ... | ... |
| if (!sps_flag_f1) |  |
| flag_f1 | u(1) |
| if (!sps_flag_f2) |  |
| flag_f2 | u(1) |
| ... | ... |
| if (!sps_flag_fN) |  |
| flag_fN | u(1) |
| ... | ... |
| } |  |

In one embodiment, an encoder may perform a subset or all of the following steps to encode one or more pictures into a coded video stream (CVS), where the CVS will comprise at least a parameter set and two or more segments.

Step 1: Determine for a flag F if the value of flag F will stay constant for all segments in the CVS.

Step 2: Signal an indicator value in a first codeword in the parameter set, where, if it is determined that the value of flag F will stay constant for all segments in the CVS, then the indicator value specifies that the value of flag F is signaled in the parameter set (or another parameter set), otherwise the indicator value specifies that the value of flag F is signaled for each segment in the CVS.

If the indicator value specifies that the value of flag F is signaled in the parameter set, then step 3A is performed otherwise step 3B is performed.

Step 3A: a) signal the value of flag F in the parameter set (the value of flag F may for instance be signaled in the first codeword together with the indicator value or in a third codeword in the parameter set) and b) for each segment, encode segment data of the segment using the value of flag F.

Step 3B: For each segment, a) signal the value of flag F in a second codeword in the segment (the second codeword is preferably signaled in the segment header) and b) encode segment data of the segment using the value of flag F for the segment.

A decoder may perform a subset or all of the following steps for this embodiment to decode one or more pictures from a coded video stream (CVS), where the CVS comprises at least one parameter set and two or more segments.

Step 1: Decode an indicator value from a first codeword in a parameter set in the CVS. The parameter set may for instance be an SPS, PPS, DPS, VPS or a PHPS. The indicator value may be a 1-bit value.

Step 2: Determine from the indicator value whether the value of a flag F is specified in a parameter set or specified by a second codeword in each coded segment.

Step 3: If it is determined that the value of the flag F is specified in a parameter set, then decode the value of the flag F from the parameter set. The value of flag F may for instance be derived from the first codeword or decoded from a separate third codeword in the parameter set.

Step 4: For each segment perform steps 4A and 4B.

Step 4A: If it is determined that the value of the flag F is specified in each segment, then decode the value of the flag F from the second codeword in the segment (the second codeword may be a part of the segment header).

Step 4B: Decode segment data of the segment using the value of flag F, which is either determined from the second codeword or from the parameter set.

Derived the Parameter Value

In one embodiment, the value of a parameter P for each segment in a CVS may be derived from another one or more parameters values in a header and/or in a parameter set in the CVS and an indicator value is signaled (e.g. in a parameter set in the CVS) that specifies whether or not the value of parameter P should be derived from the other one or more parameter values.

In another embodiment, the value of a parameter P for each segment in a CVS may be: i) derived from another one or more parameter values in a header and/or in a parameter set in the CVS or ii) signaled for each segment, and an indicator value is signaled (e.g. in a parameter set in the CVS) that specifies one of: i) that the value of parameter P should be derived or ii) that the value of parameter P is signaled in each segment.

In another embodiment, the value of a parameter P for each segment in a CVS may be: i) derived from another one or more parameter values in a header and/or in a parameter set in the CVS, ii) signaled for each segment, or iii) included in a parameter set in the CVS, and an indicator value is signaled (e.g. in a parameter set in the CVS) that specifies one of: i) that the value of parameter P should be derived, ii) that the value of parameter P is signaled in each segment, or iii) that the value of parameter P is included in a parameter set in the CVS.

In another embodiment, the value of a parameter P for each segment in a CVS may be: i) derived from another one or more parameter values in a header and/or in a parameter set in the CVS or ii) included in a parameter set in the CVS, and an indicator value is signaled (e.g. in a parameter set in the CVS) that specifies one of: i) that the value of parameter P should be derived or ii) that the value of parameter P is included in a parameter set in the CVS.

In another embodiment, a parameter set (e.g., SPS) provides information indicating one of: i) that the value of parameter P for each segment should be derived from another parameter for each segment, ii) that the value of parameter P is fixed for all segments (e.g. fixed to a default or a signaled value), or iii) that the value of parameter P is signaled for each segment.

For example, in an all-intra coding scenario or in a low delay video conferencing scenario, the parameter slice_type may be derived from the picture type. Accordingly, the value for the parameter slice_type need not be signaled for each slice (i.e., each slice need not contain a value for the parameter slice_type as the decoder can, for each slice, derive the correct slice_type parameter value).

In one embodiment, an encoder may perform a subset or all the following steps to encode one or more pictures into a coded video stream (CVS), where the CVS will comprise at least one parameter set and two or more segments.

Step 1: For a parameter P, determine whether: i) for all segments in the CVS the value of parameter P may be derived based on another parameter Q (e.g., derived from Q and zero or more other parameters), ii) the value of parameter P will stay constant for all segments in the CVS, or iii) the value of parameter P will not stay constant for all segments in the CVS and, for all segments in the CVS, cannot be derived from one or more other parameters.

Step 2: Include a first codeword (cw1) in a parameter set, where the value of cw1 (a.k.a., the "indicator value") depends on what is determined in step 1. That is, i) if it is determined that for all segments in the CVS the value of parameter P may be derived based on another parameter Q, then cw1 specifies that, for all segments in the CVS, the value of parameter P may be derived based on the parameter Q; ii) otherwise, if it is determined that the value of parameter P will stay constant for all segments in the CVS, then cw1 specifies that that the value of parameter P is signaled in a parameter set; iii) otherwise cw1 specifies that the value of parameter P is signaled for each segment in the CVS.

Step 3: If cw1 specifies that the value of parameter P is signaled in the parameter set, then signal the value of parameter P in the parameter set. The value of parameter P may for instance be signaled in the first codeword together with the indicator value or in a third codeword in the parameter set.

Step 4: For each segment performs steps 4A and 4B.

Step 4A: If cw1 specifies that the value of parameter P is signaled in each segment, then signal the value of parameter P in a second codeword in the segment. The second codeword is preferably signaled in the segment header.

Step 4B: Encode segment data of the segment using the value of parameter P.

A decoder may perform a subset or all of the following steps to decode one or more pictures from a coded video stream (CVS), where the CVS comprises at least one parameter set and two or more segments.

Step 1: Decode an indicator value from a first codeword in a parameter set in the CVS. The parameter set may for instance be an SPS, PPS, DPS, VPS or a PHPS.

Step 2: Determine from the indicator value whether: i) the value of a parameter P should be derived based on a parameter Q, ii) the value of parameter P is specified in a parameter set, or iii) the value of parameter P is specified by a second codeword in each segment of the CVS.

Step 3: If it is determined that the value of the parameter P is specified in a parameter set, then decode the value of the parameter P from the parameter set. The value of parameter P may for instance be derived from the first codeword or decoded from a third codeword in the parameter set.

Step 4: If it is determined that the value of the parameter P should be derived based on a parameter Q, then determine the parameter value for parameter Q and then derive the value of the parameter P based on the parameter value for parameter Q. For example, Pv=f(Qv, . . . ), where Pv is the parameter value for parameter P, f( ) is a function, and Qv is the parameter value for parameter Q. That is, Pv may be a function of at least Qv.

Step 5: For each segment performs steps 5A and 5B.

Step 5A: If it is determined that the value of the parameter P is specified in each segment, then decode the value of the parameter P from the second codeword in the segment.

Step 5B: Decode segment data of the segment using the value of parameter P.

EXAMPLES

Below is a specific example syntax and semantics for the SPS and the slice header on top of the current VVC draft specification. Note that not all parameters that were found to be static in the current version of VTM (5.0) software are present in the current version of the VVC draft specification (JVET-N1001-v7). Some parameters also have different names in the software and the specification although their interpretations are equivalent. For instance, five_minus_max_num_affine_merge_cand in the VTM 5.0 software is equivalent to five_minus_max_num_subblock_merge_cand in the current VVC draft specification. This is expected to be aligned once the VVC specification has been finalized.

TABLE 16

|  | Descriptor |
|---|---|
| seq_parameter_set_rbsp( ) { |  |
|   sps_decoding_parameter_set_id | u(4) |
|   ... |  |
|   sps_or_slice_flag | u(1) |
|   if ( sps_or_slice_flag ) { |  |
|     sps_or_slice_dep_quant_enabled_flag | tu(v) |
|     For (i=0, i<2;i++) |  |
|       sps_or_slice_ref_pic_list_sps_flag[i] | tu(v) |
|     sps_or_slice_temporal_mvp_enabled_flag | tu(v) |

TABLE 16-continued

| | Descriptor |
|---|---|
| sps_or_slice_mvd_l1_zero_flag | tu(v) |
| sps_or_slice_collocated_from_l0_flag | tu(v) |
| sps_or_slice_chroma_residual_scale_flag | tu(v) |
| sps_or_slice_six_minus_max_num_merge_cand | ue(v) |
| sps_or_slice_five_minus_max_num_subblock_merge_cand | ue(v) |
| sps_or_slice_max_num_merge_cand_minus_max_num_triangle_cand | ue(v) |
| } | |
| ... | |
| } | |

SPS Semantics sps_or_slice_flag equal to 0 specifies that the values of sps_or_slice_dep_quant_enabled_flag, sps_or_slice_ref_pic_list_sps_flag, sps_or_slice_temporal_mvp_enabled_flag, sps_or_slice_mvd_l1_zero_flag, sps_or_slice_collocated_from_l0_flag, sps_or_slice_six_minus_max_num_merge_cand, sps_or_slice_five_minus_max_num_subblock_merge_cand and sps_or_slice_max_num_merge_cand_minus_max_num_triangle_cand are inferred to be equal to 0. sps_or_slice_flag equal to 1 specifies that the syntax elements sps_or_slice_dep_quant_enabled_flag, sps_or_slice_ref_pic_list_sps_flag, sps_or_slice_temporal_mvp_enabled_flag, sps_or_slice_mvd_l1_zero_flag, sps_or_slice_collocated_from_l0_flag, sps_or_slice_six_minus_max_num_merge_cand, sps_or_slice_five_minus_max_num_subblock_merge_cand and sps_or_slice_max_num_merge_cand_minus_max_num_triangle_cand are present in SPS.

sps_or_slice_dep_quant_enabled_flag equal to 0 specifies that dep_quant_enabled_flag is present in slice headers. sps_or_slice_dep_quant_enabled_flag larger than 0 specifies that dep_quant_enabled_flag is inferred to be equal to sps_or_slice_dep_quant_enabled_flag minus 1. The maximum value maxVal of the truncated unary binarization tu(v) is set equal to 2.

sps_or_slice_ref_pic_list_sps_flag[i] equal to 0 specifies that ref_pic_list_sps[i] is present in slice headers. sps_or_slice_ref_pic_list_sps_flag[i] larger than 0 specifies that ref_pic_list_sps[i] is inferred to be equal to sps_or_slice_ref_pic_list_sps_flag[i] minus 1. The maximum value maxVal of the truncated unary binarization tu(v) is set equal to 2. [Note: a common parameter for all ref_pic_list_sps[i] would also be possible.]

sps_or_slice_temporal_mvp_enabled_flag equal to 0 specifies that slice_temporal_mvp_enabled_flag is present in the slice headers of slices with slice_type not equal to I in the CVS. sps_or_slice_temporal_mvp_enabled_flag larger than 0 specifies that slice_temporal_mvp_enabled_flag is inferred to be equal to sps_or_slice_temporal_mvp_enabled_flag minus 1. The maximum value maxVal of the truncated unary binarization tu(v) is set equal to 2.

sps_or_slice_mvd_l1_zero_flag equal to 0 specifies that mvd_l1_zero_flag is present in slice headers. sps_or_slice_mvd_l1_zero_flag larger than 0 specifies that mvd_l1_zero_flag is inferred to be equal to sps_or_slice_mvd_l1_zero_flag minus 1. The maximum value maxVal of the truncated unary binarization tu(v) is set equal to 2.

sps_or_slice_collocated_from_l0_flag equal to 0 specifies that collocated_from_l0_flag is present in slice headers. sps_or_slice_collocated_from_l0_flag larger than 0 specifies that collocated_from_l0_flag is inferred to be equal to sps_or_slice_collocated_from_l0_flag minus 1. The maximum value maxVal of the truncated unary binarization tu(v) is set equal to 2.

sps_or_slice_chroma_residual_scale_flag equal to 0 specifies that slice_chroma_residual_scale_flag is present in slice headers. sps_or_slice_chroma_residual_scale_flag larger than 0 specifies that slice_chroma_residual_scale_flag is inferred to be equal to sps_or_slice_chroma_residual_scale_flag minus 1. The maximum value maxVal of the truncated unary binarization tu(v) is set equal to 2.

sps_or_slice_six_minus_max_num_merge_cand equal to 0 specifies that six_minus_max_num_merge_cand is present in slice headers. sps_or_slice_six_minus_max_num_merge_cand larger than 0 specifies that six_minus_max_num_merge_cand is inferred to be equal to sps_or_slice_six_minus_max_num_merge_cand minus 1.

sps_or_slice_five_minus_max_num_subblock_merge_cand equal to 0 specifies that five_minus_max_num_subblock_merge_cand is present in slice headers. sps_or_slice_five_minus_max_num_subblock_merge_cand larger than 0 specifies that five_minus_max_num_subblock_merge_cand is inferred to be equal to sps_or_slice_five_minus_max_num_subblock_merge_cand minus 1.

sps_or_slice_max_num_merge_cand_minus_max_num_triangle_cand equal to 0 specifies that max_num_merge_cand_minus_max_num_triangle_cand is present in slice headers. sps_or_slice_max_num_merge_cand_minus_max_num_triangle_cand larger than 0 specifies that max_num_merge_cand_minus_max_num_triangle_cand is inferred to be equal to sps_or_slice_max_num_merge_cand_minus_max_num_triangle_cand minus.

TABLE 17

| | Descriptor |
|---|---|
| slice_header( ) { | |
|   slice_pic_parameter_set_id | ue(v) |
|   if( rect_slice_flag \|\| NumBricksInPic > 1 ) | |
|     slice_address | u(v) |
|   if( !rect_slice_flag && !single_brick_per_slice_flag ) | |
|     num_bricks_in_slice_minus1 | ue(v) |
|   slice_type | ue(v) |

TABLE 17-continued

| | Descriptor |
|---|---|
| if( NalUnitType = = GRA_NUT ) | |
|    recovery_poc_cnt | se(v) |
| slice_pic_order_cnt_lsb | u(v) |
| if( NalUnitType = = IDR_W_RADL \|\| NalUnitType = = IDR_N_LP \|\| | |
|    NalUnitType = = CRA_NUT ) | |
|    no_output_of_prior_pics_flag | u(1) |
| if( output_flag_present_flag ) | |
|    pic_output_flag | u(1) |
| if( ( NalUnitType != IDR_W_RADL && NalUnitType != IDR_N_LP ) \|\| | |
|    sps_idr_rpl_present_flag ) { | |
|    for( i = 0; i < 2; i++ ) { | |
|      if( num_ref_pic_lists_in_sps[ i ] > 0 | |
| && !sps_or_slice_ref_pic_list_sps_flag[ i ] && | |
|         ( i = = 0 \|\| ( i = = 1 && rpl1_idx_present_flag ) ) ) | |
|        ref_pic_list_sps_flag[ i ] | u(1) |
|      if( ref_pic_list_sps_flag[ i ] ) { | |
|        if( num_ref_pic_lists_in_sps[ i ] > 1 && | |
|          ( i = = 0 \|\| ( i = = 1 && rpl1_idx_present_flag ) ) ) | |
|         ref_pic_list_idx[ i ] | u(v) |
|      } else | |
|        ref_pic_list_struct( i, num_ref_pic_lists_in_sps[ i ] ) | |
|      for( j = 0; j < NumLtrpEntries[ i ][ RplsIdx[ i ] ]; j++ ) { | |
|        if( ltrp_in_slice_header_flag[ i ][ RplsIdx[ i ] ] ) | |
|         slice_poc_lsb_lt[ i ][ j ] | u(v) |
|        delta_poc_msb_present_flag[ i ][ j ] | u(1) |
|        if( delta_poc_msb_present_flag[ i ][ j ] ) | |
|         delta_poc_msb_cycle_lt[ i ][ j ] | ue(v) |
|      } | |
|    } | |
|    if( ( slice_type != I && num_ref_entries[ 0 ][ RplsIdx[ 0 ] ] > 1 ) \|\| | |
|      ( slice_type = = B && num_ref_entries[ 1 ][ RplsIdx[ 1 ] ] > 1 ) ) { | |
|      num_ref_idx_active_override_flag | u(1) |
|      if( num_ref_idx_active_override_flag ) | |
|        for( i = 0; i < ( slice_type = = B ? 2: 1 ); i++) | |
|         if( num_ref_entries[ i ][ RplsIdx[ i ] ] > 1 ) | |
|          num_ref_idx_active_minus1[ i ] | ue(v) |
|    } | |
| } | |
| if( partition_constraints_override_enabled_flag ) { | |
|    partition_constraints_override_flag | ue(v) |
|    if( partition_constraints_override_flag ) { | |
|      slice_log2_diff_min_qt_min_cb_luma | ue(v) |
|      slice_max_mtt_hierarchy_depth_luma | ue(v) |
|      if( slice_max_mtt_hierarchy_depth_luma != 0 ) | |
|        slice_log2_diff_max_bt_min_qt_luma | ue(v) |
|        slice_log2_diff_max_tt_min_qt_luma | ue(v) |
|      } | |
|      if( slice_type = = I && qtbtt_dual_tree_intra_flag ) { | |
|        slice_log2_diff_min_qt_min_cb_chroma | ue(v) |
|        slice_max_mtt_hierarchy_depth_chroma | ue(v) |
|        if( slice_max_mtt_hierarchy_depth_chroma != 0 ) | |
|         slice_log2_diff_max_bt_min_qt_chroma | ue(v) |
|         slice_log2_diff_max_tt_min_qt_chroma | ue(v) |
|        } | |
|      } | |
|    } | |
| } | |
| if ( slice_type != I ) { | |
|    if( !sps_or_slice_temporal_mvp_enabled_flag ) | |
|      slice_temporal_mvp_enabled_flag | u(1) |
|    if( slice_type = = B && !sps_or_slice_mvd_l1_zero_flag ) | |
|      mvd_l1_zero_flag | u(1) |
|    if( cabac_init_present_flag ) | |
|      cabac_init_flag | u(1) |
|    if( slice_temporal_mvp_enabled_flag ) { | |
|      if( slice_type = = B && !sps_or_slice_collocated_from_l0_flag ) | |
|        collocated_from_l0_flag | u(1) |
|    } | |
|    if( ( weighted_pred_flag && slice_type = = P ) \|\| | |
|      ( weighted_bipred_flag && slice_type = = B ) ) | |
|      pred_weight_table( ) | |
|    if( !sps_or_slice_six_minus_max_num_merge_cand ) | |
|      six_minus_max_num_merge_cand | ue(v) |
|    if( sps_affine_enabled_flag && | |
| !sps_or_slice_five_minus_max_num_subblock_merge_cand ) | |
|      five_minus_max_num_subblock_merge_cand | ue(v) |
|    if( sps_fpel_mmvd_enabled_flag ) | |

TABLE 17-continued

| | Descriptor |
|---|---|
|     slice_fpel_mmvd_enabled_flag | u(1) |
|     if( sps_triangle_enabled_flag && MaxNumMergeCand >= 2 && | |
| !sps_or_slice_max_num_merge_cand_minus_max_num_triangle_cand ) | |
|       max_num_merge_cand_minus_max_num_triangle_cand | ue(v) |
|   } else if ( sps_ibc_enabled_flag | |
| && !sps_or_slice_six_minus_max_num_merge_cand ) | |
|     six_minus_max_num_merge_cand | ue(v) |
|   slice_qp_delta | se(v) |
|   if( pps_slice_chroma_qp_offsets_present_flag ) { | |
|     slice_cb_qp_offset | se(v) |
|     slice_cr_qp_offset | se(v) |
|     slice_joint_cbcr_qp_offset | se(v) |
|   } | |
|   if( sps_sao_enabled_flag ) { | |
|     slice_sao_luma_flag | u(1) |
|     if( ChromaArrayType != 0 ) | |
|       slice_sao_chroma_flag | u(1) |
|   } | |
|   if( sps_alf_enabled_flag ) { | |
|     slice_alf_enabled_flag | u(1) |
|     if( slice_alf_enabled_flag ) { | |
|       slice_num_alf_aps_ids_luma | tb(v) |
|       for( i = 0; i < slice_num_alf_aps_ids_luma; i++ ) | |
|         slice_alf_aps_id_luma[ i ] | u(5) |
|       slice_alf_chroma_idc | tu(v) |
|       if( slice_alf_chroma_idc && ( slice_type != I \|\| | |
| slice_num_alf_aps_ids_luma != 1 ) ) | |
|         slice_alf_aps_id_chroma | u(5) |
|     } | |
|   } | |
|   if (!sps_or_slice_dep_quant_enabled_flag) | |
|     dep_quant_enabled_flag | u(1) |
|   if( !dep_quant_enabled_flag ) | |
|     sign_data_hiding_enabled_flag | u(1) |
|   if( deblocking_filter_override_enabled_flag ) | |
|     deblocking_filter_override_flag | u(1) |
|   if( deblocking_filter_override_flag ) { | |
|     slice_deblocking_filter_disabled_flag | u(1) |
|     if( !slice_deblocking_filter_disabled_flag ) { | |
|       slice_beta_offset_div2 | se(v) |
|       slice_tc_offset_div2 | se(v) |
|     } | |
|   } | |
|   if( sps_lmcs_enabled_flag ) { | |
|     slice_lmcs_enabled_flag | u(1) |
|     if( slice_lmcs_enabled_flag ) { | |
|       slice_lmcs_aps_id | u(5) |
|       if( !( qtbtt_dual_tree_intra_flag && slice_type = = I ) && ( | |
| !sps_or_slice_chroma_residual_scale_flag ) ) | |
|         slice_chroma_residual_scale_flag | u(1) |
|   } | |
|   if ( entropy_coding_sync_enabled_flag ) | |
|     num_entry_point_offsets | ue(v) |
|   if( NumEntryPoints > 0 ) { | |
|     offset_len_minus1 | ue(v) |
|     for( i = 0; i < NumEntryPoints; i++ ) | |
|       entry_point_offset_minus1[ i ] | u(v) |
|   } | |
|   byte_alignment( ) | |
| } | |

Figure 4:
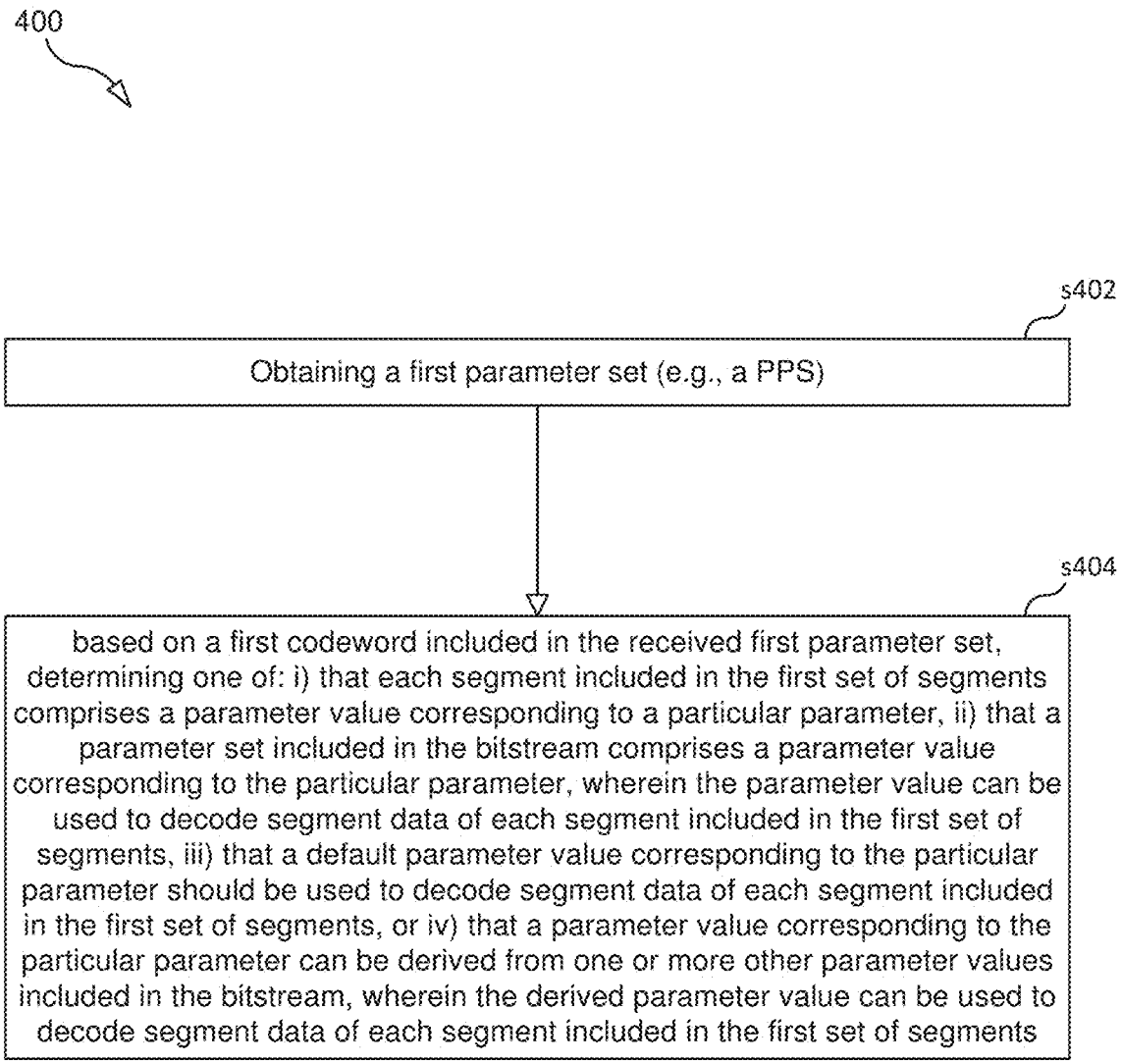
FIG. 4 is a flowchart illustrating a decoding process according to an embodiment.

FIG. 4 is a flowchart illustrating a process 400 that the decoder according to one embodiment may perform. Process 400 may begin with step s402.

Step s402 comprises the decoder obtaining (e.g., receiving from an encoder or other network node or retrieving from storage) a first parameter set of an encoded video bitstream.

Step s404 comprises the decoder, based on a first codeword included in the received first parameter set, determining one of: i) that each segment included in the first set of segments comprises a parameter value corresponding to a particular parameter, ii) that a parameter set included in the bitstream comprises a parameter value corresponding to the particular parameter (e.g., the parameter set comprises a codeword from which the parameter can be derived), wherein the parameter value can be used to decode segment data of each segment included in the first set of segments, iii) that a default parameter value corresponding to the particular parameter should be used to decode segment data of each segment included in the first set of segments, or iv) that a parameter value corresponding to the particular parameter can be derived from one or more other parameter values included in the bitstream, wherein the derived parameter value can be used to decode segment data of each segment included in the first set of segments. That is, the decoder, based on the first codeword, determines whether or not each segment included in the first set of segments comprises a parameter value corresponding to the particular parameter.

In some embodiments, in step s404, the decoder, based on the first codeword determines either: 1) that each segment included in the first set of segments comprises a parameter value corresponding to the particular parameter or 2) that a parameter set included in the bitstream comprises a parameter value corresponding to the particular parameter.

In another embodiment, in step s404, the decoder, based on the first codeword determines either: 1) that each segment included in the first set of segments comprises a parameter value corresponding to the particular parameter or 2) that a default parameter value corresponding to the particular parameter should be used to decode segment data of each segment included in the first set of segments.

In yet another embodiment, in step s404, the decoder, based on the first codeword determines either: 1) that each segment included in the first set of segments comprises a parameter value corresponding to the particular parameter or 2) that a parameter value corresponding to the particular parameter can be derived from one or more other parameter values included in the bitstream.

In some embodiments, the determining (step s404) comprises the decoder obtaining an indicator value from the first codeword included in the parameter set and determining whether or not the obtained indicator value equals a certain value.

In some embodiments, as a result of determining that the obtained indicator value equals the certain value, the decoder determines that a parameter set included in the bitstream comprises a parameter value corresponding to the particular parameter, or as a result of determining that the obtained indicator value does not equal the certain value, the decoder determines that a parameter set included in the bitstream comprises a parameter value corresponding to the particular parameter. In some embodiments, as a result of determining that a parameter set included in the bitstream comprises a parameter value corresponding to the particular parameter, the decoder obtains the parameter value from the parameter set that comprises the parameter value. In some embodiments, the parameter set that comprises the parameter value is the first parameter set, and the parameter value is encoded in the first codeword from which the indicator value is obtained and obtaining the parameter value comprises deriving the parameter value from the first codeword. In some embodiments, the parameter value is encoded in a second codeword that is distinct from the first codeword, and obtaining the parameter value comprises deriving the parameter value from the second codeword. In some embodiments, processd 400 further includes, for each segment included in the first set of segments, using the obtained parameter value to decode segment data of the segment.

In some embodiments, as a result of determining that the obtained indicator value equals the certain value, the decoder determines that each segment included in the first set of segments comprises a parameter value corresponding to the particular parameter, or as a result of determining that the obtained indicator value does not equal the certain value, the decoder determines that each segment included in the first set of segments comprises a parameter value corresponding to the particular parameter. In some embodiments, as a result of determining that each segment included in the first set of segments comprises a parameter value corresponding to the particular parameter, the decoder performs a process that includes: for each segment included in the first set of segments, obtaining from a second codeword included in the segment a parameter value corresponding to the particular parameter and using the obtained parameter value to decode segment data of the segment.

In some emobdiments, each segment included in the first set of segments is included in a different video coding layer, VCL, network abstraction layer, NAL, unit. In some emobdiments, each said segment comprises a segment header and a segment payload. In some emobdiments, the segment is a slice, the segment header is a slice header, and the segment payload contains slice data.

In some emobdiments, the first parameter set is included in a payload portion of a non-VCL NAL unit included in the bitstream. In some emobdiments, the first parameter set is a sequence parameter set (SPS), a picture parameter set (PPS), a decoder parameter set (DPS), a video parameter set (VPS), or a picture header parameter set, PHPS. A PHPS (which is sometimes also referred to as a "picture header"), contains data that is used to decode a single picture. In case a picture is partitioned into multiple slices, a PHPS may be used to signal information for all slices of the picture. This saves bits compared to the alternative where information is repeated in every slice of the picture. A PHPS may be included in a slice header, but one that is valid for all slices in a picture. Thus, a PHPS may be part of the NAL unit that contains the first slice of the picture (in this scenario the PHPS is referred to as a "picture header"). A PHPS may also be signaled instead, or in addition, to the slice header of the first slice in a picture, Thus, the PHPS may be signaled as a separate NAL unit and not in any slice NAL unit.

In some emobdiments, process 400 further includes, prior to performing the determining step, the decoder obtains information indicating that the first parameter set comprises the first codeword. In some emobdiments, obtaining the information indicating that the first parameter set comprises the first codeword comprises deriving the information from a second codeword included in the first parameter set.

In some emobdiments, the particular parameter is a 1-bit parameter.

In some emobdiments, as a result of determining that a default parameter value corresponding to the particular parameter should be used to decode segment data of each segment included in the first set of segments, the decoder performs a process that includes: obtaining the default parameter value; and, for each segment included in the first set of segments, using the obtained default parameter value to decode segment data of the segment.

In some emobdiments, as a result of determining that a parameter value corresponding to the particular parameter must be derived from one or more other parameter values included in the bitstream, the decoder performs a process that includes: deriving a parameter value corresponding to the particular parameter from one or more other parameter values included in the bitstream; and for each segment included in the first set of segments, using the derived parameter value to decode segment data of the segment. In some emobdiments, the parameter value is a slice type parameter value, and deriving the slice type parameter value comprises obtaining a picture type parameter value that identifies a picture type and deriving the slice type parameter value based on the obtained picture type parameter value.

In some emobdiments, the bitstream comprises a first CVS and a second CVS, the first parameter set and the first set of segments are both included in the first CVS, and a second parameter set and a second set of segments are both included in the second CVS. In some emobdiments, process 400 further includes the decoder receiving the second parameter set included in the second CVS; and based on a codeword included in the received second parameter set, the decoder determining one of: i) that each segment included in the second set of segments comprises a parameter value corresponding to the particular parameter, ii) that a parameter set included in the second CVS comprises a parameter value corresponding to the particular parameter and the parameter value should be used to decode segment data of each segment included in the second set of segments, iii) that a default parameter value corresponding to the particular parameter should be used to decode segment data of each segment included in the second set of segments, or iv) that a parameter value corresponding to the particular parameter must be derived from one or more other parameter values included in the CVS and the derived parameter value should be used to decode segment data of each segment included in the second set of segments.

Figure 5:
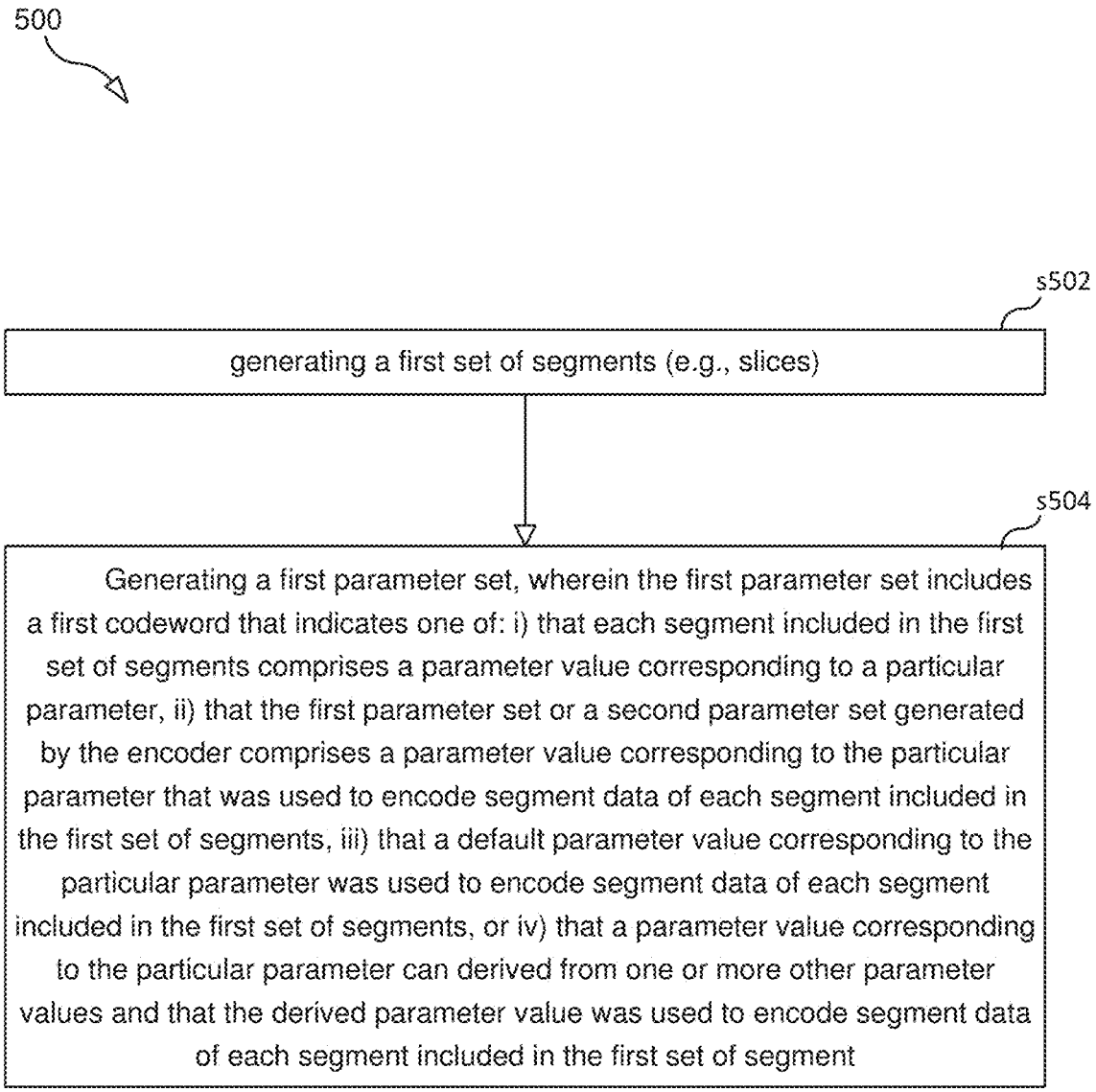
FIG. 5 is a flowchart illustrating an encoding process according to an embodiment.

FIG. 5 is a flowchart illustrating a process 500 that the encoder according to one embodiment may perform. Process 500 may begin with step s502. Step s502 comprises the encoder generating a first set of segments. Step s504 comprises the encoder generating a first parameter set. The first parameter set includes a first codeword that indicates one of: i) that each segment included in the first set of segments comprises a parameter value corresponding to a particular parameter, ii) that the first parameter set or a second parameter set generated by the encoder comprises a parameter value corresponding to the particular parameter that was used to encode segment data of each segment included in the first set of segments, iii) that a default parameter value corresponding to the particular parameter was used to encode segment data of each segment included in the first set of segments, or iv) that a parameter value corresponding to the particular parameter can derived from one or more other parameter values and that the derived parameter value was used to encode segment data of each segment included in the first set of segments.

In some embodiments, process 500 further includes, prior to generating the first parameter set, determining that a parameter value of the particular parameter would stay constant for each segment included in the first set of segments. In some emodiments, as a result of determining that the parameter value of the particular parameter would stay constant for each segment included in the first set of segments, the encoder generates the first parameter set such that the first codeword indicates that: i) a parameter set comprises a parameter value corresponding to the particular parameter, ii) a default parameter value corresponding to the particular parameter can be used to decode segment data of each segment included in the first set of segments, or iii) a parameter value corresponding to the particular parameter can be derived from one or more other parameter values included in the bitstream, wherein the derived parameter value can be used to decode segment data of each segment included in the set of segments.

Figure 6:
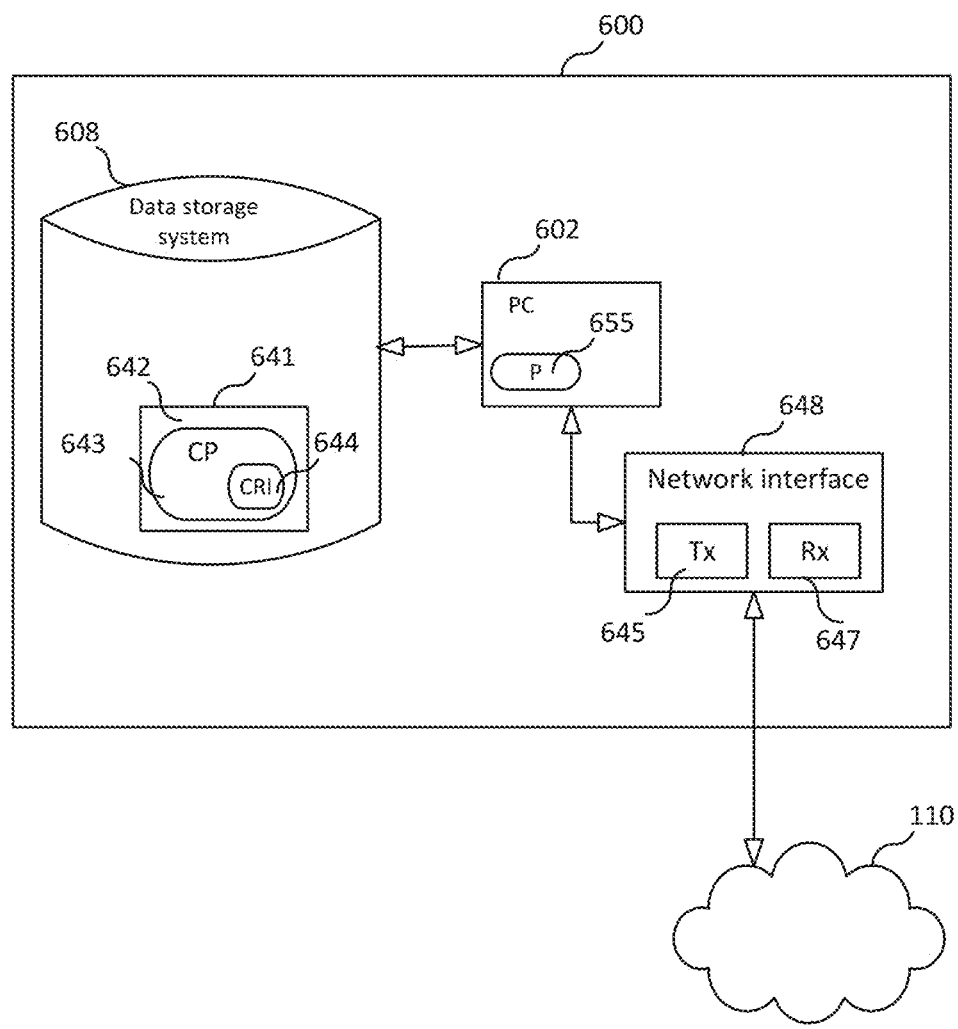
FIG. 6 is a block diagram of an apparatus according to an embodiment.

FIG. 6 is a block diagram of an apparatus 600, according to some embodiments, for implementing the video encoder 140 or the video decoder 260. As shown in FIG. 6, apparatus 600 may comprise: processing circuitry (PC) 602, which may include one or more processors (P) 655 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 600 may be a distributed computing apparatus); a network interface 648 comprising a transmitter (Tx) 645 and a receiver (Rx) 647 for enabling apparatus 600 to transmit data to and receive data from other nodes connected to a network 110 (e.g., an Internet Protocol (IP) network) to which network interface 648 is connected (directly or indirectly) (e.g., network interface 648 may be wirelessly connected to the network 110, in which case network interface 648 is connected to an antenna arrangement); and a local storage unit (a.k.a., "data storage system") 608, which may include one or more non-volatile storage devices and/or one or more volatile storage devices. In embodiments where PC 602 includes a programmable processor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, magnetic media (e.g., a hard disk), optical media, memory devices (e.g., random access memory, flash memory), and the like. In some embodiments, the CRI 644 of computer program 643 is configured such that when executed by PC 602, the CRI causes apparatus 600 to perform steps described herein (e.g., steps described herein with reference to the flow charts). In other embodiments, apparatus 600 may be configured to perform steps described herein without the need for code. That is, for example, PC 602 may consist merely of one or more ASICs. Hence, the features of the embodiments described herein may be implemented in hardware and/or software.

Figure 7A:
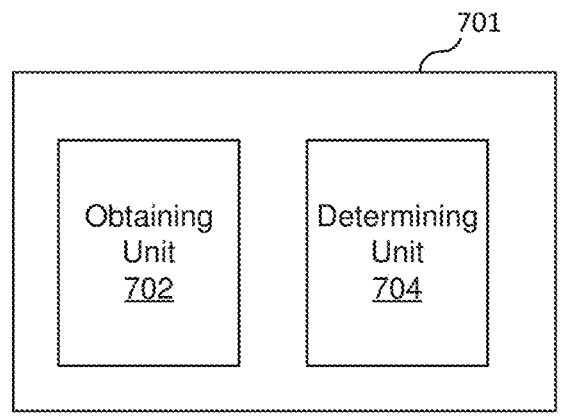
FIG. 7A is a block diagram of a video decoding apparatus according to an embodiment.

FIG. 7A illustrates functional units of a video decoding apparatus 701 according to an embodiment.

Figure 7B:
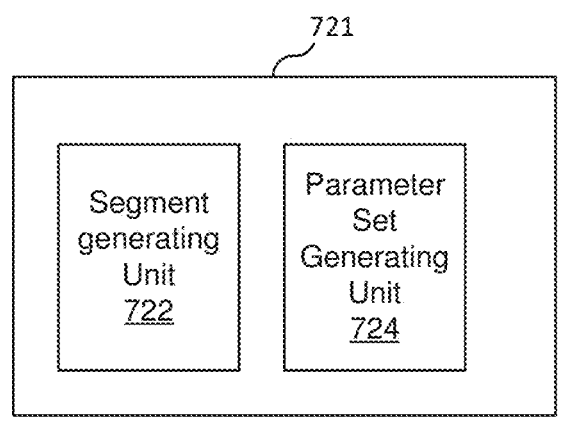
FIG. 7B is a block diagram of a video encoding apparatus according to an embodiment

FIG. 7B illustrates functional units of a video encoding apparatus 721 according to an embodiment.

Summary Of Various Embodiments

A1. A method 400 performed by a video decoder 260, 600, 701 for decoding a bitstream, the bitstream comprising a first parameter set and a first set of segments, the method comprising: obtaining the first parameter set; based on a first codeword included in the first parameter set, the decoder determining one of: i) that each segment included in the first set of segments comprises a parameter value corresponding to a particular parameter, ii) that a parameter set included in the bitstream comprises a parameter value corresponding to the particular parameter, wherein the parameter value can be used to decode segment data of each segment included in the first set of segments, iii) that a default parameter value corresponding to the particular parameter should be used to decode segment data of each segment included in the first set of segments, or iv) that a parameter value corresponding to the particular parameter can be derived from one or more other parameter values included in the bitstream, wherein the derived parameter value can be used to decode segment data of each segment included in the first set of segments.

A2. The method of embodiment A1, wherein the determining comprises the decoder obtaining an indicator value from the first codeword included in the parameter set and determining whether or not the obtained indicator value equals a certain value.

A3. The method of embodiment A2, wherein as a result of determining that the obtained indicator value equals the certain value, the decoder determines that a parameter set included in the bitstream comprises a parameter value corresponding to the particular parameter, or as a result of determining that the obtained indicator value does not equal the certain value, the decoder determines that a parameter set included in the bitstream comprises a parameter value corresponding to the particular parameter.

A4. The method of embodiment A3, wherein, as a result of determining that a parameter set included in the bitstream comprises a parameter value corresponding to the particular parameter, the decoder obtains the parameter value from the parameter set that comprises the parameter value.

A5. The method of embodiment A4, wherein the parameter set that comprises the parameter value is the first parameter set.

A6a1. The method of any embodiment A4 or A5, wherein the parameter value is encoded in the first codeword from which the indicator value is obtained and obtaining the parameter value comprises deriving the parameter value from the first codeword.

A6a2. The method of embodiment A6a1, wherein deriving the parameter value (PV) from the first codeword comprises calculating: PV=cw−1, wherein cw is the value of the first codeword.

A6b. The method of embodiment A4 or A5, wherein the parameter value is encoded in a second codeword that is distinct from the first codeword, and obtaining the parameter value comprises deriving the parameter value from the second codeword.

A7. The method of any one of embodiments A4, A5, A6a1, A6a2, and A6b, further comprising: for each segment included in the first set of segments, using the obtained parameter value to decode segment data of the segment.

A8. The method of embodiment A2, wherein as a result of determining that the obtained indicator value equals the certain value, the decoder determines that each segment included in the first set of segments comprises a parameter value corresponding to the particular parameter, or as a result of determining that the obtained indicator value does not equal the certain value, the decoder determines that each segment included in the first set of segments comprises a parameter value corresponding to the particular parameter.

A9. The method of embodiment A8, wherein, as a result of determining that each segment included in the first set of segments comprises a parameter value corresponding to the particular parameter, the decoder performs a process that includes: for each segment included in the first set of segments, obtaining from a second codeword included in the segment a parameter value corresponding to the particular parameter and using the obtained parameter value to decode segment data of the segment.

A10. The method of any one of the previous embodiments, wherein each segment included in the first set of segments is included in a different video coding layer, VCL, network abstraction layer, NAL, unit.

A11. The method of embodiment A10, wherein each said segment comprises a segment header and a segment payload.

A12. The method of embodiment A11, wherein the segment is a slice, the segment header is a slice header, and the segment payload contains slice data.

A13. The method of any one of the previous embodiments, wherein the first parameter set is included in a payload portion of a non-VCL NAL unit included in the bitstream.

A13 The method of embodiment A13, wherein the first parameter set is a sequence parameter set, SPS, a picture parameter set, PPS, a decoder parameter set, DPS, a video parameter set, VPS, or a picture header parameter set, PHPS.

A14. The method of any one of the previous embodiments, further comprising: prior to performing the determining step, the decoder obtains information indicating that the first parameter set comprises the first codeword.

A15a. The method of embodiment A14, wherein obtaining the information indicating that the first parameter set comprises the first codeword comprises deriving the information from a second codeword included in the first parameter set.

A15b. The method of embodiment A14, wherein the second codeword consists of a single bit.

A15c. The method of any one of embodiments A14, A15a, and A15b, wherein the information indicating that the first parameter set comprises the first codeword further indicates that the first parameter set further comprises a third codeword corresponding to a second particular parameter, and the method further comprises the decoder, based on the third codeword, determining whether or not each segment included in the first set of segments comprises a parameter value corresponding to the second particular parameter.

A16. The method of any one of the previous embodiments, wherein the particular parameter is a 1-bit parameter.

A17. The method of any one of embodiments A1 or A2, wherein, as a result of determining that a default parameter value corresponding to the particular parameter should be used to decode segment data of each segment included in the first set of segments, the decoder performs a process that includes: obtaining the default parameter value; and for each segment included in the first set of segments, using the obtained default parameter value to decode segment data of the segment.

A18. The method of any one of embodiments A1 or A2, wherein, as a result of determining that a parameter value corresponding to the particular parameter must be derived from one or more other parameter values included in the bitstream, the decoder performs a process that includes: deriving a parameter value corresponding to the particular parameter from one or more other parameter values included in the bitstream; and for each segment included in the first set of segments, using the derived parameter value to decode segment data of the segment.

A19. The method of embodiment A18, wherein the parameter value is a slice type parameter value, and deriving the slice type parameter value comprises obtaining a picture type parameter value that identifies a picture type and deriving the slice type parameter value based on the obtained picture type parameter value.

A20. The method of anyone of the previous embodiments, wherein the bitstream comprises a first coded video sequence, CVS, and a second CVS; the first parameter set and the first set of segments are both included in the first CVS, and a second parameter set and a second set of segments are both included in the second CVS.

A21. The method of embodiment A20, further comprising the decoder receiving the second parameter set included in the second CVS; and based on a codeword included in the received second parameter set, the decoder determining one of: i) that each segment included in the second set of segments comprises a parameter value corresponding to the particular parameter, ii) that a parameter set included in the second CVS comprises a parameter value corresponding to the particular parameter and the parameter value should be used to decode segment data of each segment included in the second set of segments, iii) that a default parameter value corresponding to the particular parameter should be used to decode segment data of each segment included in the second set of segments, or iv) that a parameter value corresponding to the particular parameter must be derived from one or more other parameter values included in the CVS and the derived parameter value should be used to decode segment data of each segment included in the second set of segments.

A22. The method of embodiment A1, wherein the determining step comprises either: i) determining that each segment included in the first set of segments comprises a parameter value corresponding to the particular parameter, or ii) determining that a parameter set included in the bitstream comprises a parameter value corresponding to the particular parameter, wherein the parameter value can be used to decode segment data of each segment included in the first set of segments.

A23. The method of embodiment A1, wherein the determining step comprises either: i) determining that each segment included in the first set of segments comprises a parameter value corresponding to the particular parameter, or ii) determining that a default parameter value corresponding to the particular parameter should be used to decode segment data of each segment included in the first set of segments.

A24. The method of embodiment A1, wherein the determining step comprises either: i) determining that each segment included in the first set of segments comprises a parameter value corresponding to the particular parameter, or ii) determining that a parameter value corresponding to the particular parameter can be derived from one or more other parameter values included in the bitstream.

B1. A method (500) performed by a video encoder (140, 600, 721), the method comprising generating a first set of segments; and generating a first parameter set, wherein the first parameter set includes a first codeword that indicates one of: i) that each segment included in the first set of segments comprises a parameter value corresponding to a particular parameter, ii) that the first parameter set or a second parameter set generated by the encoder comprises a parameter value corresponding to the particular parameter that was used to encode segment data of each segment included in the first set of segments, iii) that a default parameter value corresponding to the particular parameter was used to encode segment data of each segment included in the first set of segments, or iv) that a parameter value corresponding to the particular parameter can derived from one or more other parameter values and that the derived parameter value was used to encode segment data of each segment included in the first set of segments.

B2. The method of embodiment B1, further comprising: prior to generating the first parameter set, determining that a parameter value of the particular parameter would stay constant for each segment included in the first set of segments.

B3. The method of embodiment B2, wherein, as a result of determining that the parameter value of the particular parameter would stay constant for each segment included in the first set of segments, the encoder generates the first parameter set such that the first codeword indicates that: i) a parameter set comprises a parameter value corresponding to the particular parameter, wherein the parameter value can be used to decode segment data of each segment included in the set of segments, ii) a default parameter value corresponding to the particular parameter can be used to decode segment data of each segment included in the first set of segments, or iii) a parameter value corresponding to the particular parameter can be derived from one or more other parameter values included in the bitstream, wherein the derived parameter value can be used to decode segment data of each segment included in the set of segments.

C1. A method 400 performed by a decoder 260, 600, 701 for decoding a bitstream, the bitstream comprising a picture parameter set, PPS, and a first set of slices, the method comprising: obtaining s402 the picture parameter set; and decoding a syntax element included in the picture parameter set to obtain an indicator value (e.g., a flag), wherein the decoder is configured such that if the indicator value is set to a first value then it is determined that a picture header included in the bitstream comprises a parameter value corresponding to a particular parameter, wherein the parameter value can be used to decode slice data of each slice included in the first set of slices, otherwise it is determined that each slice included in the first set of slices comprises a parameter value corresponding to the particular parameter.

C2. A method 500 performed by an encoder 140, 600, 721, the method comprising generating (s502) a first set of slices; and generating (s504) a picture parameter set, wherein the picture parameter set includes a first codeword that is set to either a first value or a second value, when the first codeword is set to the first value, then the first codeword indicates that a picture header generated by the encoder comprises a parameter value corresponding to a particular parameter that was used to encode slice data of each slice included in the first set of slices, and when the first codeword is set to the second value, then the first codeword indicates that each slice included in the first set of slices comprises a parameter value corresponding to the particular parameter.

D1. A video decoder (260, 600, 701), the video decoder being adapted to: obtain a first parameter set included in an encoded video bitstream, wherein the bitstream also includes a first set of segments; and based on a first codeword included in the first parameter set, determine one of: i) that each segment included in the first set of segments comprises a parameter value corresponding to a particular parameter, ii) that the first parameter or a second parameter set included in the bitstream comprises a parameter value corresponding to the particular parameter, wherein the parameter value can be used to decode segment data of each segment included in the first set of segments, iii) that a default parameter value corresponding to the particular parameter should be used to decode segment data of each segment included in the first set of segments, or iv) that a parameter value corresponding to the particular parameter can be derived from one or more other parameter values included in the bitstream, wherein the derived parameter value can be used to decode segment data of each segment included in the first set of segments.

E1. A video decoder (701), the video decoder comprising: an obtaining unit (702) operable to obtain a first parameter set included in an encoded video bitstream, wherein the bitstream also includes a first set of segments; and a determining unit (704) operable to determine, based on a first codeword included in the first parameter set, one of: i) that each segment included in the first set of segments comprises a parameter value corresponding to a particular parameter, ii) that the first parameter or a second parameter set included in the bitstream comprises a parameter value corresponding to the particular parameter, wherein the parameter value can be used to decode segment data of each segment included in the first set of segments, iii) that a default parameter value corresponding to the particular parameter should be used to decode segment data of each segment included in the first set of segments, or iv) that a parameter value corresponding to the particular parameter can be derived from one or more other parameter values included in the bitstream, wherein the derived parameter value can be used to decode segment data of each segment included in the first set of segments.

F1. A video encoder (140, 600, 721), the video encoder being adapted to: generate a first set of segments; and generate a first parameter set, wherein the first parameter set includes a first codeword that indicates one of: i) that each segment included in the first set of segments comprises a parameter value corresponding to a particular parameter, ii) that the first parameter set or a second parameter set generated by the encoder comprises a parameter value corresponding to the particular parameter that was used to encode segment data of each segment included in the first set of segments, iii) that a default parameter value corresponding to the particular parameter was used to encode segment data of each segment included in the first set of segments, or iv) that a parameter value corresponding to the particular parameter can derived from one or more other parameter values and that the derived parameter value was used to encode segment data of each segment included in the first set of segments.

G1. A video encoder (721), the video encoder comprising: a segment generating unit (722) operable to generate a first set of segments; and a parameter set generating unit (724) generate a first parameter set, wherein the first parameter set includes a first codeword that indicates one of: i) that each segment included in the first set of segments comprises a parameter value corresponding to a particular parameter, ii) that the first parameter set or a second parameter set generated by the encoder comprises a parameter value corresponding to the particular parameter that was used to encode segment data of each segment included in the first set of segments, iii) that a default parameter value corresponding to the particular parameter was used to encode segment data of each segment included in the first set of segments, or iv) that a parameter value corresponding to the particular parameter can derived from one or more other parameter values and that the derived parameter value was used to encode segment data of each segment included in the first set of segments.

H1. A computer program (643) comprising instructions (644) which when executed by processing circuitry (602) causes the processing circuitry (602) to perform the method of any one of the above embodiments A1-A24, B1-B3, C1-C2.

H2. A carrier containing the computer program of embodiment H1, wherein the carrier is one of an electronic signal, an optical signal, a radio signal, and a computer readable storage medium (642).

Advantages

As noted in the Summary section, an advantage of the above described embodiments is that, for each parameter that stays constant in at least a portion of a bitstream (e.g. in a CVS), there is no need to signal the parameter value for the parameter at the segment (e.g. slice) level, which saves bits and improves the overall compression efficiency.

Following the previous example from the CTC one can on average save 16.5, 7.9, 12.8 and 7.8 bits per slice for each of the AI, RA, LDB and LDP configurations for VTM 5.0 as shown in the table below.

TABLE 18

Estimated Average Number of Bits Saved Per Slice

| Slice parameter | Average bits saved per slice | | | |
| --- | --- | --- | --- | --- |
| | AT | RA | LDB | LDP |
| no_output_of_prior_pics_flag | 1 | | | |
| slice_sao_luma_flag | 1 | | | |
| slice_sao_chroma_flag | 1 | | | |
| tile_group_alf_enabled_flag | 1 | | | |
| dep_quant_enabled_flag | 1 | 1 | 1 | 1 |
| partition_constrainst_override_flag | 1 | | | |
| slice_loop_filter_across_slices_enabled_flag[1] | 1 | 1 | 1 | 1 |
| short_term_ref_pic_set_sps_flag[2] | 0.99 | | 1 | 1 |
| inter_ref_pic_set_prediction_flag | 0.99 | | | |
| slice_temporal_mvp_enabled_flag | | | 1 | 1 |
| mvd_l1_zero_flag | | | 1 | |
| collocated_from_l0_flag | | | 1 | |
| num_negative_pics | 0.99 | | | |
| num_positive_pics | 0.99 | | | |
| reshaper_model_delta_max_bin_idx | 2.39 | | | |
| slice_reshaper_ChromaAdj[3] | | | 0.79 | 0.79 |
| six_minus_max_num_merge_cand | 0.16 | 0.9 | 8 1 | 1 |

TABLE 18-continued

Estimated Average Number of Bits Saved Per Slice

| Slice parameter | Average bits saved per slice | | | |
|---|---|---|---|---|
| | AI | RA | LDB | LDP |
| five_minus_max_num_affine_merge_cand[4] | | 0.98 | 1 | 1 |
| max_num_merge_cand_minus_max_num_triangle_cand | | 2.93 | 3 | |
| collocated_ref_idx[5] | | 0.96 | 1 | 1 |
| slice_type | 3 | | | |
| Summary | 16.5 | 7.9 | 12.8 | 7.8 |

Notes: 1) slice_loop_filter_across_slices_enabled_flag is not part of the VVC 5.0 v7 spec (this flag was moved to PPS); 2) short_term_ref_pic_set_sps_flag is not part of the VVC 5.0 v7 spec (the flags ref_pic_list_sps_flag[i] should be equivalent; 3) slice_reshaper_ChromaAdj is not part of the VVC 5.0 v7 spec (slice_chroma_residual_scale_flag should be equivalent); 4) five_minus_max_num_affine_merge_cand is not part of the VVC 5.0 v7 spec (this parameter should be equivalent to five_minus_max_num_subblock_merge_cand); and 5) collocated_ref_idx is not part of the VVC 5.0 v7 spec (there seems to be no equivalent parameter).

Abbreviations

ALF Adaptive Loop Filter
APS Adaptation Parameter Set
AUD Access Unit Delimiter
BLA Broken Link Access
CRA Clean Random Access
CVS Coded Video Sequence
CVSS CVS Start
CU Coding Unit
DPS Decoder Parameter Set
GRA Gradual Random Access
HEVC High-efficiency Video Coding
IDR Instantaneous Decoding Refresh
IRAP Intra Random Access Point
JVET Joint Video Exploratory Team
LMCS Luma Mapping and Chroma Scaling
MPEG Motion Picture Experts Group
NAL Network Abstraction Layer
PES Packetized Elementary Stream
PPS Picture Parameter Set
RADL Random Access Decodable Leading
RASL Random Access Skip Leading
SPS Sequence Parameter Set
STSA Step-wise Temporal Sub-layer Access
TSA Temporal Sub-layer Access
VCL Video Coding Layer
VPS Video Parameter Set
VVC Versatile Video Coding
SEI Supplemental Enhancement Layer Contribution (This portion of the disclosure contains relevant portions of a contribution that may be submitted for consideration)

Begin Draft Contribution

Title: Parameters in SPS or slice headers
Status: Input document to JVET
Purpose: Proposal Summary Some of the slice parameters in VVC stay constant for all slices in the bitstream for some CTC configurations. This contribution proposes a mechanism to enable signaling some of the slice parameters in VVC either in the SPS or for each slice.

More specifically, the following changes to VVC are proposed in this contribution:

(1) Signal a sps_or_slice_flag in SPS that specifies whether the values of the below listed syntax elements may be conditionally signalled in SPS or slice headers, or if they are always signaled in slice headers.
  a. dep_quant_enabled_flag,
  b. ref_pic_list_sps_flag,
  c. slice_temporal_mvp_enabled_flag,
  d. mvd_l1_zero_flag,
  e. collocated_from_l0_flag,
  f. six_minus_max_num_merge_cand
  g. five_minus_max_num_subblock_merge_cand
  h. max_num_merge_cand_minus_max_num_triangle_cand
(2) If sps_or_slice_flag is equal to 1, then for each of the above syntax elements, signal a corresponding parameter in SPS. If the corresponding parameter value is equal to 0, then the corresponding syntax element is signalled in the slice header. Otherwise the value for the corresponding slice header syntax element is derived as the SPS parameter value minus 1.

The luma BD-rate numbers for the CTC are reported to be 0.0%/0.0%/-0.1%/0.0% for AI/RA/LDB/LDP respectively and the proponents claim higher savings when multiple slices per picture are used.

Introduction

It has been observed that some parameters in the slice header stay constant for all slice headers in all test sequences of the CTC. The table below shows in which CTC configurations using VTM 5.0 certain parameters stay constant for all slice headers in all test sequences.

TABLE 19

Slice parameters that stay constant for each CTC configuration using VTM 5.0

| Slice parameter name | Constant in | | | |
| --- | --- | --- | --- | --- |
| | AI | RA | LDB | LDP |
| dep_quant_enabled_flag | x | x | x | x |
| short_term_ref_pic_set_sps_flag | x | | x | x |
| slice_temporal_mvp_enabled_flag | | | x | x |
| mvd_l1_zero_flag | | | | x |
| collocated_from_l0_flag | | | | x |
| six_minus_max_num_merge_cand | x | x | x | x |
| five_minus_max_num_affine_merge_cand | | x | x | x |
| max_num_merge_cand_minus_max_num_triangle_cand | | x | x | |

It is noted that a couple of the slice parameter names differ between VTM 5.0 and the draft VVC specification, JVET-N1001-v8. We therefore suggest to change the name of short_term_ref_pic_set_sps_flag and five_minus_max_num_affine_merge_cand to ref_pic_list_sps[0], ref_pic_list_sps[1] and five_minus_max_num_subblock_merge_cand in the VTM software.

Proposal

It is redundant to send parameters in the slice header which stay constant for all slice headers in the bitstream.

Therefore, a mechanism is proposed to enable signaling some of the slice parameters either in the SPS or for each slice.

More specifically, the following changes to VVC are proposed in this contribution:

(1) Signal a sps_or_slice_flag in the SPS that specifies whether the values of the below listed syntax elements may be conditionally signalled in the SPS or slice headers, or if they are always signaled in slice headers.
  a. dep_quant_enabled_flag,
  b. ref_pic_list_sps_flag,
  c. slice_temporal_mvp_enabled_flag,
  d. mvd_l1_zero_flag,
  e. collocated_from_l0_flag,
  f. six_minus_max_num_merge_cand
  g. five_minus_max_num_subblock_merge_cand
  h. max_num_merge_cand_minus_max_num_triangle_cand If the sps_or_slice_flag is equal to 1, then for each of the above syntax elements, signal a corresponding parameter in the SPS.

If the parameter value is equal to 0, then the syntax element is signalled for each slice header. Otherwise the value for the syntax element is derived as the parameter value minus 1.

Proposed Changes to the VVC Specification

The proposed changes on top of the VVC draft (JVET-N1001-v8) are shown.

| | Descriptor |
| --- | --- |
| seq_parameter_set_rbsp( ) { | |
| ... | |
|   sps_or_slice_flag | u(1) |
|   if ( sps_or_slice_flag ) { | |
|     sps_or_slice_dep_quant_enabled_flag | tu(v) |
|     for( i = 0; i < 2; i++ ) | |
|       sps_or_slice_ref_pic_list_sps_flag[ i ] | tu(v) |
|     sps_or_slice_temporal_mvp_enabled_flag | tu(v) |
|     sps_or_slice_mvd_l1_zero_flag | tu(v) |
|     sps_or_slice_collocated_from_l0_flag | tu(v) |
|     sps_or_slice_six_minus_max_num_merge_cand | ue(v) |
|     sps_or_slice_five_minus_max_num_subblock_merge_cand | ue(v) |
|     sps_or_slice_max_num_merge_cand_minus_max_num_triangle_cand | ue(v) |
|   } | |
|   if( sps_or_slice_temporal_mvp_enabled_flag != 1 ) | |
|     sps_sbtmvp_enabled_flag | u(1) |
|   ... | |
| } | | sps_or_slice_flag equal to 0 specifies that sps_or_slice_dep_quant_enabled_flag, sps_or_slice_ref_pic_list_sps_flag, sps_or_slice_temporal_mvp_enabled_flag, sps_or_slice_mvd_l1_zero_flag, sps_or_slice_collocated_from_l0_flag, sps_or_slice_six_minus_max_num_merge_cand, sps_or_slice_five_minus_max_num_subblock_merge_cand and sps_or_slice_max_num_merge_cand_minus_max_num_triangle_cand are inferred to be equal to 0. sps_or_slice_flag equal to 1 specifies that these syntax elements are present in SPS.

sps_or_slice_dep_quant_enabled_flag equal to 0 specifies that dep_quant_enabled_flag is present in slice headers. sps_or_slice_dep_quant_enabled_flag larger than 0 specifies that dep_quant_enabled_flag is inferred to be equal to sps_or_slice_dep_quant_enabled_flag minus 1. The maximum value maxVal of the truncated unary binarization tu(v) is set equal to 2.

sps_or_slice_ref_pic_list_sps_flag[i] equal to 0 specifies that ref_pic_list_sps[i] is present in slice headers.

sps_or_slice_ref_pic_list_sps_flag[i] larger than 0 specifies that ref_pic_list_sps[i] is inferred to be equal to sps_or_slice_ref_pic_list_sps_flag[i] minus 1. The maximum value maxVal of the truncated unary binarization tu(v) is set equal to 2.

sps_or_slice_temporal_mvp_enabled_flag equal to 0 specifies that slice_temporal_mvp_enabled_flag is present in the slice headers of slices with slice_type not equal to I in the CVS. sps_or_slice_temporal_mvp_enabled_flag larger than 0 specifies that slice_temporal_mvp_enabled_flag is inferred to be equal to sps_or_slice_temporal_mvp_enabled_flag minus 1. The maximum value maxVal of the truncated unary binarization tu(v) is set equal to 2.

sps_or_slice_mvd_l1_zero_flag equal to 0 specifies that mvd_l1_zero_flag is present in slice headers. sps_or_slice_mvd_l1_zero_flag larger than 0 specifies that mvd_l1_zero_flag is inferred to be equal to sps_or_slice_mvd_l1_zero_flag minus 1. The maximum value maxVal of the truncated unary binarization tu(v) is set equal to 2.

sps_or_slice_collocated_from_l0_flag equal to 0 specifies that collocated_from_l0_flag is present in slice headers. sps_or_slice_collocated_from_l0_flag larger than O specifies that collocated_from_l0_flag is inferred to be equal to sps_or_slice_collocated_from_l0_flag minus 1. The maximum value maxVal of the truncated unary binarization tu(v) is set equal to 2.

sps_or_slice_six_minus_max_num_merge_cand equal to 0 specifies that six_minus_max_num_merge_cand is present in slice headers. sps_or_slice_six_minus_max_num_merge_cand larger than 0 specifies that six_minus_max_num_merge_cand is inferred to be equal to sps_or_slice_six_minus_max_num_merge_cand minus 1. The value of sps_or_slice_six_minus_max_num_merge_cand shall be in the range of 0 to 6, incusive.

sps_or_slice_five_minus_max_num_subblock_merge_cand equal to 0 specifies that five_minus_max_num_subblock_merge_cand is present in slice headers. sps_or_slice_five_minus_max_num_subblock_merge_cand larger than 0 specifies that five_minus_max_num_subblock_merge_cand is inferred to be equal to sps_or_slice_five_minus_max_num_subblock_merge_cand minus 1. The value of sps_or_slice_five_minus_max_num_subblock_merge_cand shall be in the range of 0 to 6, inclusive.

sps_or_slice_max_num_merge_cand_minus_max_num_triangle_cand equal to 0 specifies that max_num_merge_cand_minus_max_num_triangle_cand is present in slice headers. sps_or_slice_max_num_merge_cand_minus_max_num_triangle_cand larger than 0 specifies that max_num_merge_cand_minus_max_num_triangle_cand is inferred to be equal to sps_or_slice_max_num_merge_cand_minus_max_num_triangle_cand minus 1. The value of sps_or_slice_max_num_merge_cand_minus_max_num_triangle_cand shall be in the range of 0 to MaxNumMergeCand—1.

|  | Descriptor |
|---|---|
| slice_header( ) { | |
| ... | |
|   if( ( NalUnitType != IDR_W_RADL && NalUnitType != IDR_N_LP ) \|\| | |
|     sps_idr_rpl_present_flag ) { | |
|     for( i = 0; i < 2; i++ ) { | |
|       if( num_ref_pic_lists_in_sps[ i ] > 0 && !sps_or_slice_ref_pic_list_sps_flag[ i ] && | |
|         ( i = = 0 \|\| ( i = = 1 && rpl1_idx_present_flag ) ) ) | |
|         ref_pic_list_sps_flag[ i ] | u(1) |
| ... | |
|   if ( slice_type != I ) { | |
|     if( !sps_or_slice_temporal_mvp_enabled_flag ) | |
|       slice_temporal_mvp_enabled_flag | u(1) |
|     if( slice_type = = B && !sps_or_slice_mvd_l1_zero_flag ) | |
|       mvd_l1_zero_flag | u(1) |
| ... | |
|     if( slice_temporal_mvp_enabled_flag ) { | |
|       if( slice_type = = B && !sps_or_slice_collocated_from_l0_flag ) | |
|         collocated_from_l0_flag | u(1) |
|     } | |
| ... | |
|     if( !sps_or_slice_six_minus_max_num_merge_cand ) | |
|       six_minus_max_num_merge_cand | ue(v) |
|     if( sps_affine_enabled_flag && !sps_or_slice_five_minus_max_num_subblock_merge_cand ) | |
|       five_minus_max_num_subblock_merge_cand | ue(v) |
| ... | |
|     if( sps_triangle_enabled_flag && MaxNumMergeCand >= 2 && !sps_or_slice_max_num_merge_cand_minus_max_num_triangle_cand ) | |
|       max_num_merge_cand_minus_max_num_triangle_cand | ue(v) |
|     } else if ( sps_ibc_enabled_flag && !sps_or_slice_six_minus_max_num_merge_cand ) | |
|       six_minus_max_num_merge_cand | ue(v) |
| ... | |
|   if ( !sps_or_slice_dep_quant_enabled_flag ) | |
|     dep_quant_enabled_flag | u(1) |
| ... | |
|   byte_alignment( ) | |
| } | |

Results

The bitrate savings for the CTC using VTM-5.0 is shown below. For AI, the sps_or_slice_flag is set to 0 since an SPS is sent for each picture. Note that there is no noise in these BD rate numbers, since the gains do not come from change in quality but purely from saving bits by signaling constant parameters in SPS instead of in the slice headers. For the Johnny sequence in LDB. the BD rate is −0.37%.

| All Intra Main10 | | | | | |
|---|---|---|---|---|---|
| | Over VTM-5.0 | | | | |
| | Y | U | V | EncT | DecT |
| Class A1 | 0.00% | 0.00% | 0.00% | 98% | 98% |
| Class A2 | 0.00% | 0.00% | 0.00% | 99% | 100% |
| Class B | 0.00% | 0.00% | 0.00% | 98% | 99% |
| Class C | 0.00% | 0.00% | 0.00% | 105% | 102% |
| Class E | 0.00% | 0.00% | 0.00% | 94% | 95% |
| Overall | 0.00% | 0.00% | 0.00% | 99% | 99% |
| Class D | 0.00% | 0.00% | 0.00% | 98% | 100% |
| Class F | 0.00% | 0.00% | 0.00% | 100% | 100% |

| Random Access Main 10 | | | | | |
|---|---|---|---|---|---|
| | Over VTM-5.0 | | | | |
| | Y | U | V | EncT | DecT |
| Class A1 | 0.00% | 0.00% | 0.00% | 100% | 98% |
| Class A2 | 0.00% | 0.00% | 0.00% | 100% | 98% |
| Class B | −0.01% | −0.01% | −0.01% | 99% | 97% |
| Class C | −0.02% | −0.02% | −0.02% | 99% | 91% |
| Class E | | | | | |
| Overall | −0.01% | −0.01% | −0.01% | 101% | 100% |
| Class D | −0.07% | −0.06% | −0.07% | 98% | 95% |
| Class F | −0.02% | −0.02% | −0.02% | 105% | 91% |

| Low delay B Main10 | | | | | |
|---|---|---|---|---|---|
| | Over VTM-5.0 | | | | |
| | Y | U | V | EncT | DecT |
| Class A1 | | | | | |
| Class A2 | | | | | |
| Class B | −0.02% | −0.01% | −0.02% | 101% | 98% |
| Class C | −0.04% | −0.04% | −0.04% | 102% | 100% |
| Class E | −0.25% | −0.20% | −0.20% | 97% | 99% |
| Overall | −0.08% | −0.07% | −0.07% | 100% | 99% |
| Class D | −0.13% | −0.11% | −0.11% | 103% | 105% |
| Class F | −0.12% | −0.09% | −0.10% | 100% | 97% |

| Low delay P Main10 | | | | | |
|---|---|---|---|---|---|
| | Over VTM-5.0 | | | | |
| | Y | U | V | EncT | DecT |
| Class A1 | | | | | |
| Class A2 | | | | | |
| Class B | −0.01% | −0.01% | −0.01% | 101% | 101% |
| Class C | −0.02% | −0.02% | −0.02% | 101% | 102% |
| Class E | −0.08% | −0.07% | −0.07% | 100% | 101% |
| Overall | −0.03% | −0.03 | −0.03% | 102% | 102% |
| Class D | −0.05% | −0.04% | −0.04% | 104% | 105% |
| Class F | −0.05% | −0.05% | −0.05% | 102% | 101% |

Estimated Results for non-CTC Configurations

In a non-CTC configuration with multiple slices the bit savings is expected to be higher. A rough estimation is done in the table shown below by multiplying the CTC bit savings with the number of slices:

Estimated Bit Savings for Multiple Slices Per Picture

| Estimated bit savings for multiple slices per picture | | | |
|---|---|---|---|
| | Estimated bit savings (Y) | | |
| X slices per picture | RA | LDB | LDP |
| 6 | −0.06% | −0.48% | −0.18% |
| 24 (OMAF example) | −0.24% | −1.92% | −0.72% |

End Contribution

While various embodiments are described herein (including the attached draft contribution), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for decoding a bitstream comprising a first parameter set and a first set of slices, the method comprising:
obtaining an indicator value encoded in the first parameter set;
determining either that 1) a second parameter set included in the bitstream should comprise a parameter value corresponding to a particular parameter or 2) each slice included in the first set of slices should comprise a parameter value corresponding to the particular parameter, wherein the determining comprises determining whether the indicator value equals a certain value, wherein
if the indicator value equals the certain value, then the second parameter set should comprise a parameter value corresponding to the particular parameter, otherwise each slice included in the first set of slices should comprise a parameter value corresponding to the particular parameter.

2. The method of claim 1, wherein
the method further comprises, after determining that the indicator value equals the certain value, obtaining from the second parameter set a parameter value corresponding to the particular parameter and using the obtained parameter value to decode slice data of each slice included in the first set of slices.

3. The method of claim 1, wherein
the method further comprises, after determining that the indicator value does not equal the certain value, for each slice included in the first set of slices, obtaining from the slice a parameter value corresponding to the particular parameter and using the obtained parameter value to decode slice data of the slice.

4. The method of claim 1, wherein each slice included in the first set of slices is included in a different video coding layer (VCL) network abstraction layer (NAL) unit.

5. The method of claim 1, wherein the first parameter set is included in a payload portion of a non-VCL NAL unit included in the bitstream.

6. The method of claim 1, further comprising:
prior to obtaining the indicator value encoded in the first parameter set, obtaining information indicating that the first parameter set comprises a first syntax element encoding the indicator value.

7. The method of claim 6, wherein obtaining the information indicating that the first parameter set comprises the first syntax element comprises deriving the information from a second syntax element included in the first parameter set.

8. The method of claim 6, wherein
the information indicating that the first parameter set comprises the first syntax element further indicates that the first parameter set further comprises a third syntax element corresponding to a second particular parameter, and
the method further comprises, based on the third syntax element, determining whether or not each slice included in the first set of slices comprises a parameter value corresponding to the second particular parameter.

9. The method of claim 1, wherein
the bitstream comprises a first coded video sequence (CVS) and a second CVS;
the first parameter set and the first set of slices are both included in the first CVS, and
a third parameter set and a second set of slices are both included in the second CVS.

10. The method of claim 9, further comprising:
obtaining a second indicator value encoded in the third parameter set;
determining either that 1) a fourth parameter set included in the bitstream should comprise a parameter value corresponding to the particular parameter or 2) each slice included in the second set of slices should comprise a parameter value corresponding to the particular parameter, wherein the determining comprises determining whether the second indicator value equals the certain value, wherein
if the second indicator value equals the certain value, then the fourth parameter set should comprise a parameter value corresponding to the particular parameter, otherwise each slice included in the second set of slices should comprise a parameter value corresponding to the particular parameter.

11. A decoder for decoding a bitstream, the bitstream comprising a first parameter set and a first set of slices, the decoder comprising:
memory; and
processing circuit coupled to the memory, wherein the decoder is configured to perform a method comprising:
obtaining an indicator value encoded in the first parameter set;
determining either that 1) a second parameter set included in the bitstream should comprise a parameter value corresponding to a particular parameter or 2) each slice included in the first set of slices should comprise a parameter value corresponding to the particular parameter, wherein the determining comprises determining whether the indicator value equals a certain value, wherein
if the indicator value equals the certain value, then the second parameter set should comprise a parameter value corresponding to the particular parameter, otherwise each slice included in the first set of slices should comprise a parameter value corresponding to the particular parameter.

12. The decoder of claim 11, wherein
the method further comprises, after determining that the indicator value equals the certain value, obtaining from the second parameter set a parameter value corresponding to the particular parameter and using the obtained parameter value to decode slice data of each slice included in the first set of slices.

13. The decoder of claim 11, wherein
the method further comprises, after determining that the indicator value does not equal the certain value, for each slice included in the first set of slices, obtaining from the slice a parameter value corresponding to the particular parameter and using the obtained parameter value to decode slice data of the slice.

14. The decoder of claim 11, wherein each slice included in the first set of slices is included in a different video coding layer (VCL) network abstraction layer (NAL) unit.

15. The decoder of claim 11, wherein the first parameter set is included in a payload portion of a non-VCL NAL unit included in the bitstream.

16. The decoder of claim 11, wherein the decoder is further configured to:
prior to obtaining the indicator value encoded in the first parameter set, obtain information indicating that the first parameter set comprises a first syntax element encoding the indicator value.

17. The decoder of claim 16, wherein obtaining the information indicating that the first parameter set comprises the first syntax element comprises deriving the information from a second syntax element included in the first parameter set.

18. The decoder of claim 16, wherein
the information indicating that the first parameter set comprises the first syntax element further indicates that the first parameter set further comprises a third syntax element corresponding to a second particular parameter, and
the decoder is further configured to determine, based on the third syntax element, whether or not each slice included in the first set of slices comprises a parameter value corresponding to the second particular parameter.

19. The decoder of claim 11, wherein
the bitstream comprises a first coded video sequence (CVS) and a second CVS;

the first parameter set and the first set of slices are both included in the first CVS, and third parameter set and a second set of slices are both included in the second CVS.

20. The decoder of claim 19, wherein the decoder is further configured to perform a method comprising:

obtaining a second indicator value encoded in the third parameter set;

determining either that 1) a fourth parameter set included in the bitstream should comprise a parameter value corresponding to the particular parameter or 2) each slice included in the second set of slices should comprise a parameter value corresponding to the particular parameter, wherein the determining comprises determining whether the second indicator value equals the certain value, wherein if the second indicator value equals the certain value, then the fourth parameter set should comprise a parameter value corresponding to the particular parameter, otherwise each slice included in the second set of slices should comprise a parameter value corresponding to the particular parameter.

21. A non-transitory computer readable storage medium storing a computer program comprising instructions which when executed by processing circuitry of the decoder causes the decoder to perform the method of claim 1.

22. The method of claim 1, wherein a parameter value corresponding to the particular parameter comprises:

a flag specifying whether or not sample adaptive offset (SAO) is enabled for luma samples, and/or a flag specifying whether or not sample adaptive offset (SAO) is enabled for chroma samples.

23. The method of claim 1, wherein the first parameter set is a picture parameter set (PPS) and the second parameter set is a picture header (PH), the first parameter set is a sequence parameter set (SPS) and the second parameter set is a PH, the first parameter set is a video parameter set (VPS) and the second parameter set is a PH, or the first parameter set is a decoder parameter set (DPS) and the second parameter set is a PH.

24. The method of claim 1, wherein the first parameter set is a sequence parameter set (SPS) and the second parameter set is a picture parameter set (PPS), the first parameter set is a video parameter set (VPS) and the second parameter set is a PPS, the first parameter set is a decoder parameter set (DPS) and the second parameter set is a PPS, the first parameter set is a VPS and the second parameter set is a SPS, or the first parameter set is a DPS and the second parameter set is a SPS.

25. The method of claim 1, wherein the first parameter set is a picture header (PH) and the second parameter set is the PH, the first parameter set is a picture parameter set (PPS) and the second parameter set is the PPS, or the first parameter set is a sequence parameter set (SPS) and the second parameter set is the SPS.

26. The decoder of claim 11, wherein a parameter value corresponding to the particular parameter comprises:

a flag specifying whether or not sample adaptive offset (SAO) is enabled for luma samples, and/or a flag specifying whether or not sample adaptive offset (SAO) is enabled for chroma samples.

27. The decoder of claim 11, wherein the first parameter set is a picture parameter set (PPS) and the second parameter set is a picture header (PH), the first parameter set is a sequence parameter set (SPS) and the second parameter set is a PH, the first parameter set is a video parameter set (VPS) and the second parameter set is a PH, or the first parameter set is a decoder parameter set (DPS) and the second parameter set is a PH.

* * * * *